United States Patent
Rao

(10) Patent No.: US 12,411,905 B2
(45) Date of Patent: Sep. 9, 2025

(54) BROWSER EXTENSION WITH AUTOMATION TESTING SUPPORT

(71) Applicant: Sauce Labs Inc., San Francisco, CA (US)

(72) Inventor: Rajagopal Rao, San Jose, CA (US)

(73) Assignee: Sauce Labs Inc., San Francisco, CA (US)

( * ) Notice: Subject to any disclaimer, the term of this patent is extended or adjusted under 35 U.S.C. 154(b) by 290 days.

(21) Appl. No.: 18/169,678

(22) Filed: Feb. 15, 2023

(65) Prior Publication Data

US 2023/0195825 A1 Jun. 22, 2023

Related U.S. Application Data

(63) Continuation-in-part of application No. 17/660,305, filed on Apr. 22, 2022, now Pat. No. 12,079,298, (Continued)

(51) Int. Cl.
*G06F 3/048* (2013.01)
*G06F 3/0481* (2022.01)
(Continued)

(52) U.S. Cl.
CPC ........ *G06F 16/9574* (2019.01); *G06F 3/0481* (2013.01); *G06F 3/0485* (2013.01);
(Continued)

(58) Field of Classification Search
None
See application file for complete search history.

(56) References Cited

U.S. PATENT DOCUMENTS 10,650,065 B2* 5/2020 Savarkar ............... G06F 16/951
10,789,328 B1* 9/2020 Jadhav ................. H04L 63/168
(Continued)

OTHER PUBLICATIONS

"Kumar, "How to use ChroPath?", Aug. 27, 2017, https://chropath.wordpress.com/2017/08/27/how-to-use-chropath/" (Year: 2017).*
(Continued)

*Primary Examiner* — Thanh T Vu
(74) *Attorney, Agent, or Firm* — Weaver Austin Villeneuve & Sampson LLP

(57) ABSTRACT

Described are methods and corresponding systems for generating and using selectors during web development. In some implementations, one or more natural language statements are obtained as input to a software application, for example, a web browser extension. The one or more input statements are analyzed, using natural language processing, to identify a first web element of a webpage and an action to be performed with respect to the first web element. A selector is then generated based on one or more attributes of the first web element. The selector operates as an address of the first web element and can, for example, be an XPath or CSS selector. To provide a user with access to the selector, the selector can be displayed on a user interface and/or saved to an output file. In some instances, the selector is generated as part of program code executable to perform the action.

18 Claims, 20 Drawing Sheets

Related U.S. Application Data which is a continuation of application No. 16/664,785, filed on Oct. 25, 2019, now abandoned.

(60) Provisional application No. 62/750,256, filed on Oct. 25, 2018.

(51) Int. Cl.
  *G06F 3/0485* (2022.01)
  *G06F 8/61* (2018.01)
  *G06F 16/957* (2019.01)
  *G06F 16/958* (2019.01)
  *G06F 40/143* (2020.01)

(52) U.S. Cl.
  CPC .............. *G06F 8/61* (2013.01); *G06F 16/986* (2019.01); *G06F 40/143* (2020.01)

(56) References Cited

U.S. PATENT DOCUMENTS

| | | | |
|---|---|---|---|
| 12,079,298 | B2 | 9/2024 | Kumar et al. |
| 2011/0184990 | A1 | 7/2011 | Murphy et al. |
| 2013/0091419 | A1* | 4/2013 | Caliman ............... G06F 16/986 715/236 |
| 2017/0337177 | A1* | 11/2017 | Maxwell, III ...... G06F 16/9535 |
| 2017/0344227 | A1 | 11/2017 | Stoicov et al. |
| 2019/0034441 | A1 | 1/2019 | Capon |
| 2019/0213224 | A1 | 7/2019 | Zhao et al. |
| 2020/0042578 | A1* | 2/2020 | Wu ........................ G06F 40/186 |
| 2020/0081593 | A1* | 3/2020 | Nasson ................. G06F 3/0482 |
| 2022/0350857 | A1 | 11/2022 | Kumar et al. |

OTHER PUBLICATIONS

"Kumar, ChroPath 1.0, YouTube, May 1, 2017, https://www.youtube.com/watch?v=4Qhwtaf6TOE" (Year: 2017).*

Harsh, "How to Install and Use FireBug and FirePath in FireFox," 2016, pp. 1-8.

U.S. Corrected Notice of Allowance dated Jan. 17, 2024 in U.S. Appl. No. 17/660,305.

U.S. Final office Action dated Dec. 24, 2021 in U.S. Appl. No. 16/664,785.

U.S. Non-Final office Action dated Apr. 23, 2021 in U.S. Appl. No. 16/664,785.

U.S. Non-Final Office Action dated Aug. 16, 2023, in U.S. Appl. No. 17/660,305.

U.S. Non-Final Office Action dated Mar. 15, 2023 in U.S. Appl. No. 17/660,305.

U.S. Notice of Allowance dated Apr. 24, 2024 in U.S. Appl. No. 17/660,305.

U.S. Notice of Allowance dated Jan. 2, 2024 in U.S. Appl. No. 17/660,305.

U.S. Restriction Requirement dated Nov. 9, 2020 in U.S. Appl. No. 16/664,785.

* cited by examiner

TEST CODE 600 driver.findElement(By.xpath=("//li[@id='menu-item-21775']//a[contains(text(), 'Products')]")).getText(); ← 602
driver.findElement(By.xpath=("//li[@id='menu-item-20745']//a[contains(text(), 'Features')]")).getText(); ← 604
driver.findElement(By.xpath=("//li[@id='menu-item-21777']//a[contains(text(), 'Resources')]")) ← 606

612
getText()
getAttribute(String name)
getCssValue(String propertyName)
getLocation()
getSize

FIG. 6

| # | | | |
|---|---|---|---|
| | XPATH(64) | | ⬜ COPY ALL |
| 1 | 840-A—(153) | //div | |
| 3 | 840-B—(74) | //a | |
| 4 | 840-C—(1) | //li[@id='menu-item-21775']//a[contains(text(),'Products')] | |
| 5 | 840-D—(0) | //li[@id='menu-item-20745']//a[contains(text(),'Features')] | |
| 6 | 840-E—(1) | //li[@id='menu-item-21777']//a[contains(text(),Resources')] | |
| | | ... | |

FIG. 8

| | TEST FILE 1100 |
|---|---|
| 1 | Open website |
| 2 | Find username by relative XPath |
| 3 | Set username |
| 4 | Find password by relative XPath |
| 5 | Set password |
| 6 | Find Login by CSS selector |
| 7 | Click on Login using mouse action |
| 8 | Find Contacts by absolute XPath |
| 9 | Click on Contacts tab using keyboard action |

BROWSER EXTENSION WITH AUTOMATION TESTING SUPPORT

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present disclosure relates generally to development and testing of web applications and more specifically relates to techniques for generating and using selectors in connection with web applications.

BACKGROUND

Websites are generally groupings of interlinked webpages containing a mix of interactive and non-interactive elements. Modern websites are significantly more feature-rich compared to websites during the early days of the Internet. Whereas early websites were written almost entirely in HyperText Markup Language (HTML), today's websites are often built using HTML in combination with other web technologies such as Cascading Style Sheets (CSS) and JavaScript. Websites frequently serve as the frontend to a web application. As such, the expertise of software developers or testers is often called upon to create, update, and maintain websites. The lifecycle of a web application generally involves repeated testing to ensure website functionality is preserved across changes to the website. Because repeated testing is laborious to perform manually, automation testing tools have been created to assist developers and testers. Selenium and Cucumber are two examples of open-source tools commonly used for automation testing.

To perform an action on a webpage element, whether during testing or interaction with an end-user, the webpage element is identified by its corresponding address. This address is known as a selector or sometimes referred to as a locator. Selectors/locators can be specified for elements that involve user input (e.g., a checkbox, a clickable button, or a fillable text box) as well as non-interactive elements such as a section of content (e.g., a <div> or <span> element). Currently, developers and testers obtain selectors manually, which can be cumbersome, error prone, and time consuming. For example, when a website is updated, multiple selectors in a test script may need to be manually rewritten to point to the same elements as before the update. Automation testing tools can assist with the overall testing process but are not capable of generating selectors automatically.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to implementations by one skilled in the art without departing from the spirit and scope of the disclosure.

FIG. 6 shows an example of test code containing selectors, according to some embodiments.

FIG. 8 shows an example of a user interface displaying search results, according to some embodiments.

FIG. 11 shows an example of a test file containing natural language statements, according to some embodiments.

DETAILED DESCRIPTION

Figure 1:
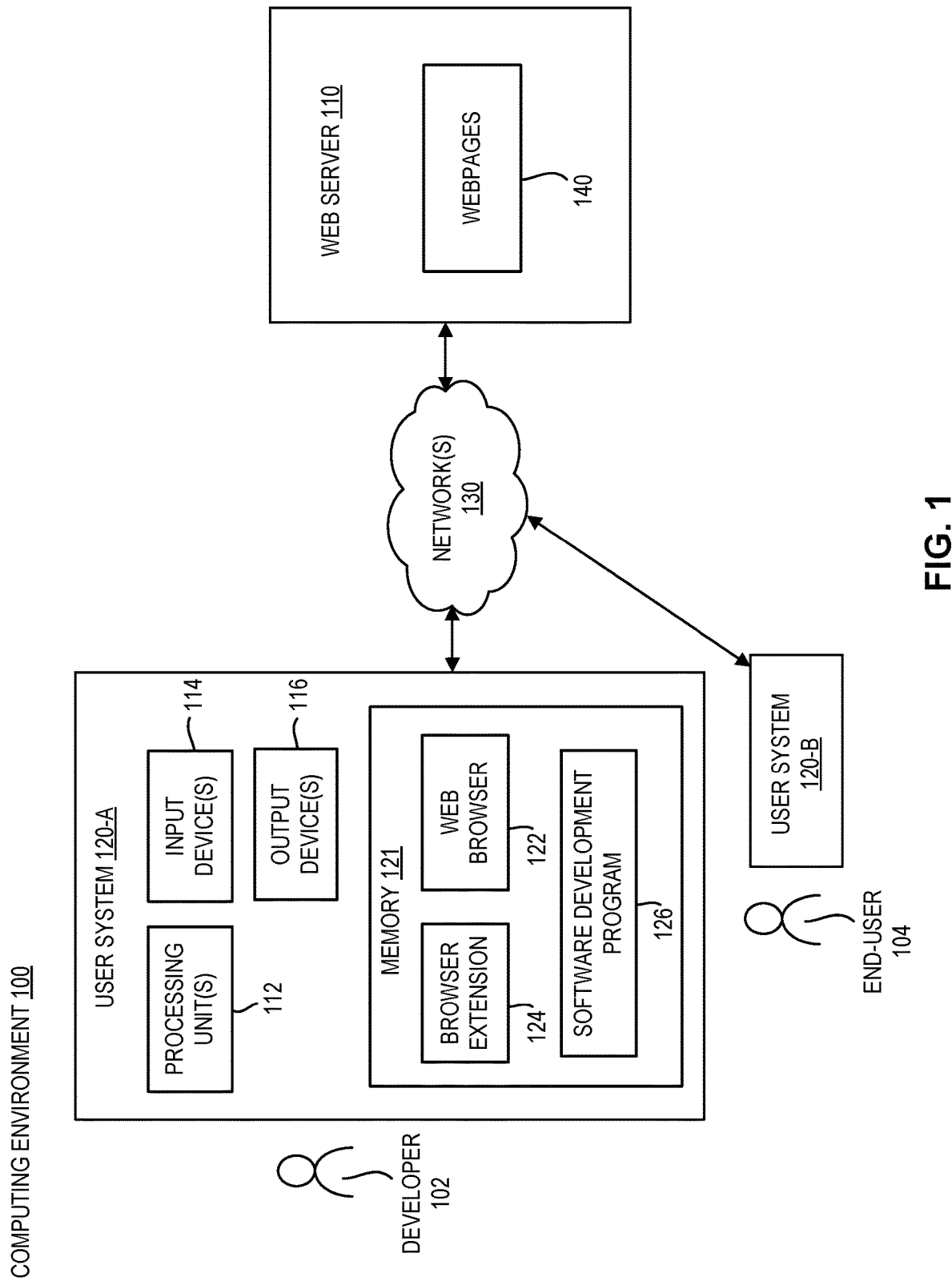
FIG. 1 shows a block diagram of a computing environment in which a web browser extension can be executed, according to some embodiments.

Disclosed herein are examples of systems, apparatus, and methods for generating selectors through a browser extension. The browser extension may be executed within a web browser program, e.g., in a first window of the web browser. The web browser may be used to view or access webpages, e.g., to display a webpage under development in a second window or sub-window. In some embodiments, functionality described with respect to a browser extension may be provided through a standalone software application or an application executable both in-browser and independently of a web browser. Further, the browser extension may be a component of a larger software application or a set of related software applications, e.g., a web development suite. As such, certain features of the browser extension may be implemented using other software components that can be executed in conjunction with the browser extension. For example, aspects of the present disclosure relate to using natural language processing (NLP) to identify webpage elements for which selectors are to be generated. Such processing may be performed by an NLP agent built into the browser extension or by a software application having the NLP agent and the browser extension as separate modules.

The disclosed examples are provided solely to add context and aid in the understanding of the present disclosure. It will be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

The described subject matter may be implemented in the context of any computer-implemented system. Further, the described subject matter may be implemented in connection with two or more separate and distinct computer-implemented systems that cooperate and communicate with one another. One or more examples may be implemented in numerous ways, including as a process, an apparatus, a system, a device, a method, a computer-readable medium such as a non-transitory computer-readable storage medium containing computer-readable instructions or computer program code, or as a computer program product comprising a computer-usable medium having computer-readable program code embodied therein.

Example methods and processes are disclosed with respect to ordered sequences of operations or steps, e.g., in the form of a flow chart diagram. Such examples are provided merely to illustrate possible arrangements of steps and do not limit the scope of the methods and processes to the disclosed sequence. In other embodiments, steps may be combined, added, omitted, or performed in a different order. Further, functionality disclosed with respect to different methods, e.g., a method depicted in a first flow chart and a method depicted in a second flow chart, may be combined.

The terms "selector" and "locator" are used interchangeably herein to refer to an address of a webpage element. Webpage elements may also be referred to as web elements or simply "elements". Examples of selectors include XPath selectors and Cascading Style Sheets (CSS) selectors. CSS is a style sheet language used for describing the presentation of a document written in a markup language such as HTML. XPath (XML Path Language) is a query language for selecting nodes from an XML (eXtensible Markup Language) document. Each type of selector has a specific format associated with it. For example, the format of an absolute XPath selector, the format of a relative XPath selector, and the format of a CSS selector are different.

Example functionality disclosed with respect to a browser extension may be implemented in connection with testing and development of a webpage or web application accessed through a webpage. As such, a browser extension may at times be referred to as a "DevTool web browser extension". DevTools can include a set of web developer tools built directly into a web browser and/or executed independently of a web browser. For example, in some embodiments, a browser extension may be part of a suite of software development programs including a software compiler, a software debugger, a Document Object Model (DOM) viewer, an HTML editor, and/or the like.

DOM is a cross-platform and language-independent interface that treats an XML or HTML document as a tree structure. Each branch of the tree ends in a node, and each node represents a corresponding part of the document. A node can contain objects or, more generally, information about the document part (e.g., a webpage element) that the node represents. Using a DOM, a developer can change the structure, style, or content of a document. A node can have one or more event handlers attached or associated with it. Each event handler may be executed in automated response to a trigger event.

FIG. 1 shows a block diagram of an example computing environment 100 in which a browser extension can be executed. The environment 100 includes a web server 110 and user systems 120-A and 120-B. Each of the user systems 120 is a computer system that includes a computing device (e.g., a laptop, a desktop, a smartphone, a tablet, etc.). The user system 120-A is operated by a first user (a developer 102). The user system 120-B is operated by a second user (an end-user 104). User system 120-A may include one or more processing units 112 such as a Central Processing Unit (CPU) or microprocessor. Processing units 112 may also include special purpose processors such as a graphics processing unit (GPU). The processing unit(s) 112 may be configured to execute software installed in a memory 121 of the user system 120-A.

User system 120-A may further include one or more input devices 114 and one or more output devices 116 for interacting with the developer 102. Input devices 114 include, but are not limited to, keyboards, computer mice, trackballs, touchscreens, touchpads, microphones, cameras, and/or the like. Output devices 116 may include a display monitor, an image projector, a loudspeaker, an earbud, an audio headset, a motor that vibrates to provide haptic feedback, and/or the like. In some cases, such as with a touchscreen, an input device may also serve as an output device.

Memory 121 can be formed by one or more memory devices, including non-volatile storage devices (e.g., read-only memory (ROM) or flash memory), volatile storage devices (e.g., random access memory (RAM)), or a combination of volatile and non-volatile memory. As shown in FIG. 1, the memory 121 may include a web browser 122, a browser extension 124, and a software development program 126. The browser extension 124 and the software development program 126 can together form a DevTool suite. Web browser 122 can be used to access webpages and may include a built-in DOM viewer. In additional to providing storage for software applications, the memory 121 may also include working memory for storing data generated and/or operated on during runtime execution of software applications.

Browser extension 124 is configured to generate selectors for elements residing within a webpage. As described in further detail below, the browser extension can generate one or more selectors automatically in response selection of an option presented in a user interface of the browser extension 124 (e.g., a single click of a button). Browser extension 124 may be configured to concurrently generate multiple types of selectors for the same element. For example, the browser extension 124 may generate a relative XPath, an absolute XPath, and a CSS selector for an element, all in response to a single click. In some implementations, the user of the browser extension (e.g., developer 102) manually selects an individual element for which one or more selectors are to be generated. Alternatively or additionally, the browser extension 124 may be configured to concurrently generate selectors for multiple elements without requiring the user to select individual elements, e.g., all elements on the webpage or elements across different webpages that collectively form a website.

In general, a selector can be generated for any addressable element of a webpage. Such web elements can be interactive or non-interactive. For example, a webpage may include one or more informational elements (e.g., a section of text) that are displayed when the webpage is viewed on a web browser. A webpage may also include one or elements that respond to or capture user input, e.g., a checkbox, a radio button, a hyperlink, a text input box, etc. In some instances, an element may contain sub-elements, which may also be addressable. For example, a web form may contain a blank or pre-filled text input box and a submit button. Further, a webpage can include multiple instances of the same element or type of element. Each instance can have a unique identifier (ID) associated with it so that the instance is individually addressable, but instances may sometimes share the same name and/or other attributes. The ID may be unique within the webpage or across multiple webpages of the same website. As such, a selector generated for a first button named "Submit" would typically be different from a selector generated for a second button named "Submit".

Software development program 126 can provide testing, authoring, and/or other webpage development related functionality. For example, the software development program 126 can be an automation testing program such as Selenium IDE, which is an integrated development environment (IDE) used for executing test scripts written in any of a number of common programming languages including Java, C#, Python, and Perl. In some embodiments, the browser extension 124 itself may be configured to provide an integrated development environment in which webpages can be authored and tested. As such, the software development program 126 may be omitted depending on implementation.

As shown in FIG. 1, the user system 120-A can communicate with other computing systems or devices via one or more networks 130. The network(s) 130 may include one or more wireless networks, one or more wireline networks, or a combination of wired and wireless networks. For example, the network(s) 130 can be any one or any combination of a LAN (local area network), a WAN (wide area network), and the Internet. The network(s) 130 may communicatively couple the user system 120-A to the web server 110. For example, the developer 102 may operate the user system 120-A to upload a new webpage or a new version of an existing webpage to the web server 110 for storage as one of multiple webpages 140 hosted on the web server 110. After being uploaded, the webpage can be published to make the webpage accessible to other user systems communicatively coupled to the web server 110. For example, the webpage can be made available over the Internet to the end-user 104 and other members of the general public.

User system 120-B may be configured similarly to the user system 120-A. User system 120-B may, for instance, include one or more processing units, one or more input devices, one or more output devices, and memory storing applications executable by the user system 120-B. The applications stored in the memory of the user system 120-B may include a web browser, e.g., the web browser 122 or a different web browsing program.

FIG. 1 is a simplified example to illustrate some of the computing devices involved in the creation and use of a webpage, as well as the corresponding users of such computing devices. Additional computing devices or systems may also participate in the computing environment 100. In some instances, multiple users (e.g., a developer and a separate tester) may be involved in the initial creation and/or subsequent maintenance of a webpage.

Figure 2:
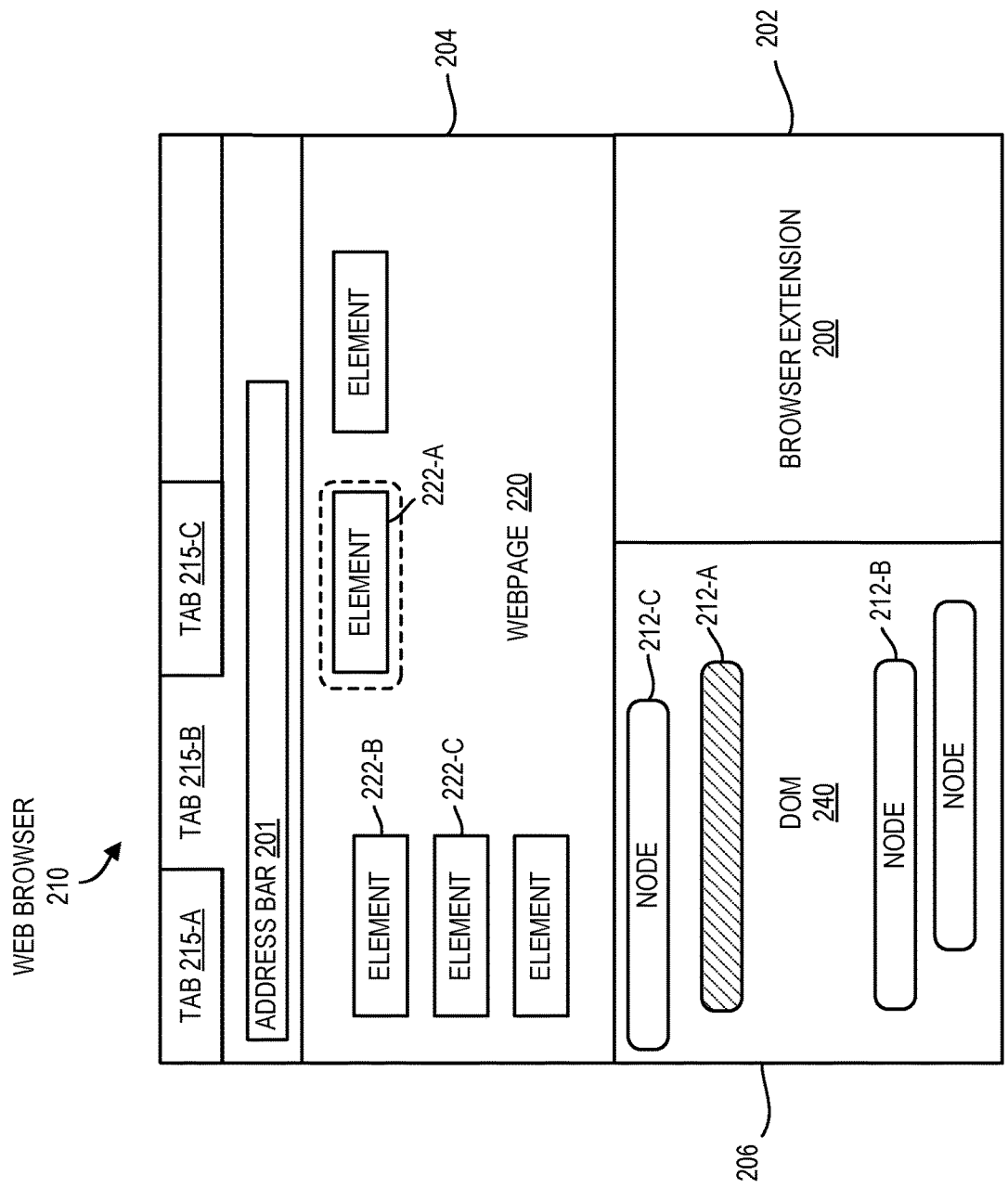
FIG. 2 shows an example of a web browser extension executing within a web browser, according to some embodiments.

FIG. 2 shows a web browser extension 200 executing within a web browser 210, according to some embodiments. In the example of FIG. 2, the browser 210 is running with three tabs open: tabs 215-A, 215-B, and 215-C. The browser extension 200 is accessed through a user interface presented in a first window 202 within the tab 215-B. As shown in the figure, tab 215-B is the currently active tab. The remaining tabs 215-A and 215-C are running in the background and not visible. The browser extension 200 performs processing with respect to a webpage 220 that has been loaded for display in a second window 204 of the tab 215-B. The tabs 215-A and 215-C may be used to view other webpages including, for example, another page of a website that the webpage 220 belongs to, a webpage being developed as part of a different website, or a webpage not under development (e.g., a webpage accessed in the same manner as an end-user).

Tab 215-B further includes an address bar 201 and a third window 206. The address bar 201 may display a Uniform Resource Locator (URL) associated with the webpage 220 and may also be used to navigate to another webpage. The window 206 displays a DOM 240 and may correspond to a user interface presented in response to the user choosing to inspect an element on the webpage 220. The DOM 240 is an internal representation of the webpage 220 that indicates to the web browser 210 how to render the content of the webpage 220. The DOM 240 can be generated based on the source code of the webpage 220, which can include HTML and non-HTML code, e.g., CSS or JavaScript code.

The DOM 240 has a hierarchical tree structure with nodes 212 representing elements on the webpage 220, e.g., nodes 212-A, 212-B, and 212-C. The nodes 212 may be connected in accordance with the relationships (e.g., parent-child) between the various webpage elements. Each node has a single parent node but can have multiple child nodes. The DOM 240 indicates what objects are contained within the webpage 220 and how those objects relate to each other. The objects represented by the nodes 212 may correspond to structural elements (divs, containers, sections, etc.). The DOM 240 can be displayed in the form of a tree graph with nodes and branches connecting the nodes. More often, a DOM is displayed in HTML format, with the HTML code being indented to represent different levels of the hierarchy. The HTML code of a child node is nested within the HTML code representing the child's parent. The DOM 240 may be accessed by selecting an element in the window 204. For example, the DOM 240 may initially be displayed in response to the user right-clicking on an element 222-A in the window 204 and selecting an "inspect element" option. When the DOM 240 is initially displayed, the DOM may be centered about the position of a node representing the element 222-A. When the user selects another element 222, the DOM 240 may automatically scroll to the position of the corresponding node 212.

Browser extension 200 is configured to generate one or more selectors (e.g., absolute XPath, relative XPath, and/or CSS) for an element of the webpage 220. The selectors generated by the browser extension 200 may be displayed in the window 202 and/or output to a digital file, e.g., an electronic spreadsheet or text document. In some implementations, the selectors may be saved to a comma-separated values (CSV) or JavaScript Object Notation (JSON) file. The user interface of the browser extension 200 may include an option (e.g., a clickable button) to generate the selector(s) for an individual element, e.g., an element 222 selected from the window 204. In some embodiments, the browser extension 200 may generate selectors for multiple elements in response to a single click or other user action. For example, the browser extension 200 may generate selectors for every element or a subset of elements (e.g., a certain type of element) in the webpage 220, including elements that are off-screen, in response to a single click. The browser extension 200 may even be configured to generate selectors across different webpages in a single pass, e.g., for every element in every webpage of the same website.

Browser extension 200 may provide additional functionality besides generating selectors. For example, browser extension 200 may be used to search the DOM 240 for nodes that match a search query provided by the user. The query can be in the form of a complete or partial selector for one or more elements of interest. For example, the user may be interested in obtaining a selector for a particular element on the webpage 220. The user may have some knowledge of how a selector for the particular element should be structured, but the user may not be familiar with the exact format, or the user may want to save time by having the browser extension generate the complete selector rather than completing the selector manually. Accordingly, the user may search for the node representing the particular element by inputting a partial selector as a query. After locating the node representing the particular element, the user may perform an input action to cause the browser extension to generate the complete selector, e.g., the single click option described above.

The results of the search can include a list of matching nodes arranged in the order in which these nodes are found in the DOM 240. As a visual aid to the user, each matching node (e.g., node 212-A) may be highlighted in window 206. The DOM 240 may automatically scroll to the first matching node. The browser extension 200 may provide an option to scroll the DOM 240 to the next or previous matching node. Further, the elements corresponding to the matching nodes can also be highlighted or otherwise visually emphasized, e.g., with a border outline, as shown with respect to element 222-A. The webpage 220 in the window 204 can be automatically scrolled to the corresponding element in synchronization with scrolling of the DOM 240.

Figure 3:
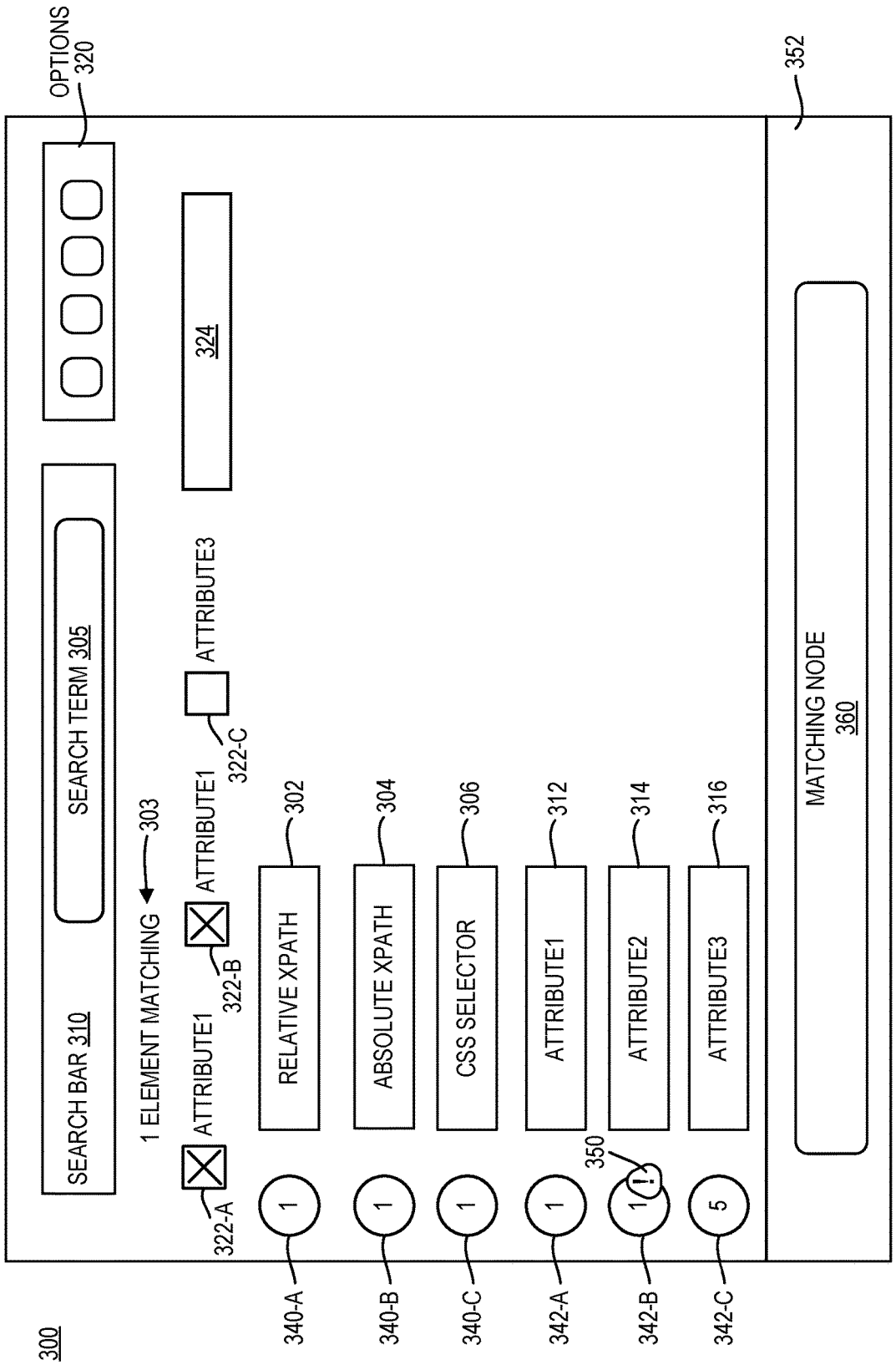
FIG. 3 shows an example user interface of a web browser extension, according to some embodiments.

FIG. 3 shows an example user interface (UI) 300 of a web browser extension, according to some embodiments. The UI 300 corresponds to one implementation of the browser extension displayed in FIG. 2. As shown in FIG. 3, the UI 300 may include a search bar 310 configured to accept a search term 305. The UI 300 may further include a set of options 320 that provide access to functionality of the browser extension. For example, the options 320 can include a button to generate a selector, a button to copy a selector, a button to save a selector to an output file, and so on. In the example shown, the search results include a single matching node, as indicated by a message 303 displayed underneath the search bar 310. Further, the UI 300 presents multiple selectors for the matching node, including a relative XPath 302, an absolute XPath 304, and a CSS selector 306. Each of the selectors 302, 304, and 306 is a properly formatted selector generated by the browser extension for the element corresponding to the matching node.

The browser extension may be configured to generate the selectors 302, 304, and 306 using one or more attributes of a webpage element. Examples of attributes include ID, name, class name, link text, partial link text, and tag name. Each attribute may be displayed with an option 322 (e.g., a checkbox) to select or deselect the attribute. The user can select the attributes desired (e.g., by keeping boxes 322-A and 332-B checked while unchecking a box 322-C) and the browser extension will update the selectors accordingly. Further, the UI 300 may include an input field 324 that permits the user to specify a custom attribute for use in generating the selectors.

UI 300 may also be configured to present statistics on the various items of information presented to the user. Such statistics can aid user understanding of the structure of the webpage and can also facilitate selection or generation of well-formatted selectors. In general, a well-formatted selector is any selector that serves to uniquely address its corresponding element. Accordingly, the UI 300 may display counters 340-A, 340-B, and 340-C as visual confirmation that each selector is unique. Similarly, the UI 300 may display counters 342-A, 342-B, and 342-C to indicate how many instances of the attributes are found. For example, the counters 342-A and 342-B may indicate that there is only one instance of a value for a first attribute 312 (e.g., the ID of an element) and one instance of a value for a second attribute 314 (e.g., the name of the element), respectively. In some cases, there may be multiple instances of an attribute, for example, five instances of a third attribute 316 corresponding to a CSS class named "green-text". Presenting counters for attributes is useful for helping the user choose a combination of attributes that would result in a unique selector for the element of interest. Thus, the UI 300 can be configured to present guidance on what attributes to use in the event that the user prefers not to adopt the selectors auto-suggested by the browser extension, e.g., selectors generated based on a default set of attributes. Additionally, the browser extension may be configured to detect attributes that are dynamic and alert the user to the presence of such attributes, e.g., by displaying a warning icon 350. Dynamic attributes are attributes having values that are subject to change and can therefore result in selectors that become invalid.

UI 300 may further include a window 352 for displaying a matching node 360 corresponding to the currently selected node in a list of nodes matching the search term 305. Displaying the matching node 360 in the window 352 permits the user to view the matching node outside the context of the DOM and to readily access the contents of the matching node with less visual clutter.

Figure 4:
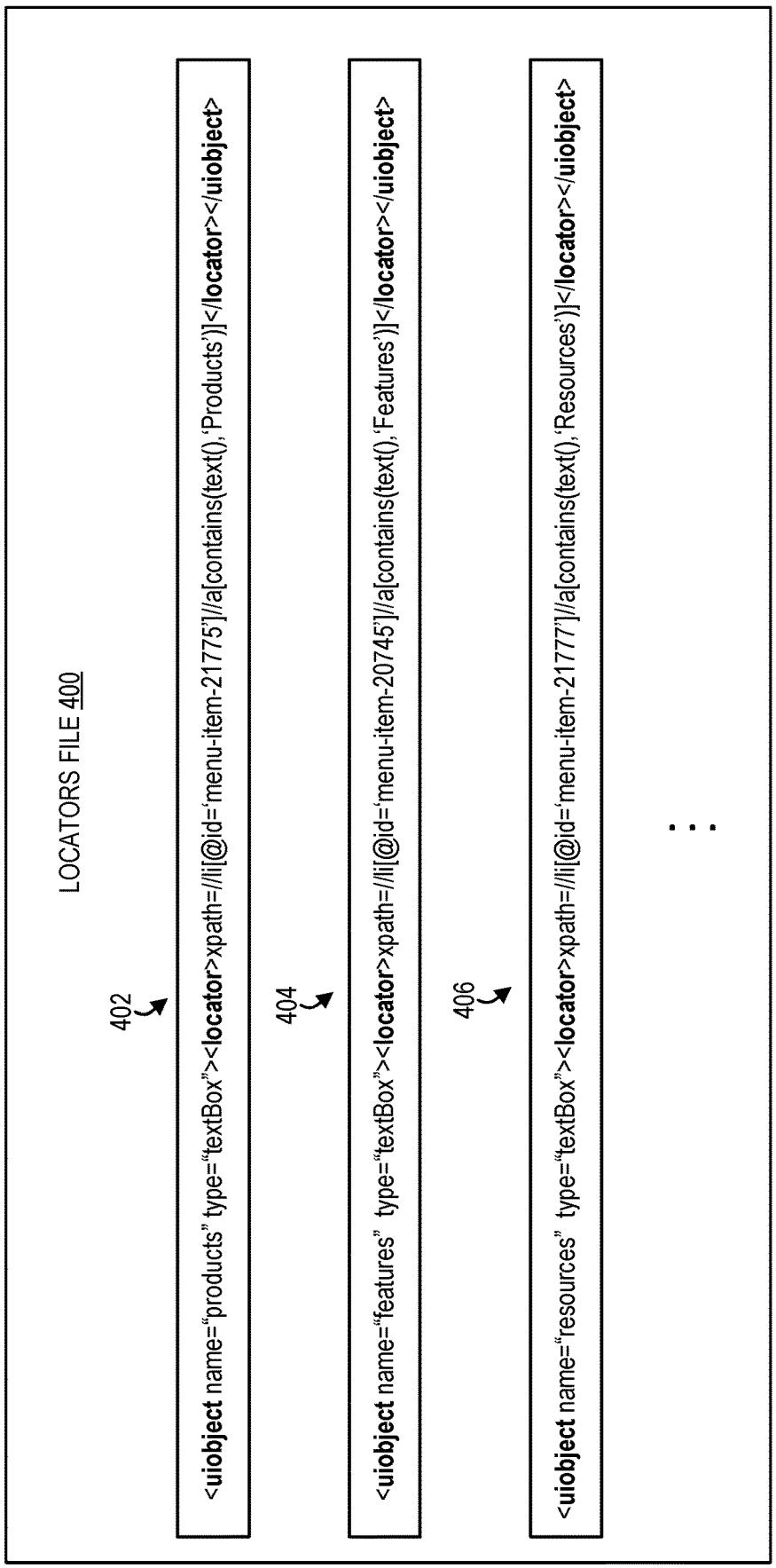
FIG. 4 shows an example of a file containing selectors, according to some embodiments.

FIG. 4 shows an example of a file 400 containing selectors, according to some embodiments. The file 400 can be stored as an electronic document on a user system and can include selectors generated automatically by the browser extension. The file 400 can also be user-edited, e.g., to include manually written selectors or to make changes to automatically generated selectors. The file 400 can be used in various ways. For example, a developer may copy and paste one or more selectors from the file 400 into a test script. More generally, the file 400 may be used to keep track of and organize selectors for the elements of a webpage.

In the example shown, the file 400 includes a selector 402 for an element named "products", a selector 404 for an element named "features", and a selector 406 for an element named "resources". Such elements may be objects displayed on a webpage. For example, the elements corresponding to the selectors 402, 404, and 406 may be displayed on the webpage as hyperlinks. As shown in FIG. 4, each of the selectors 402, 404, and 406 is a relative XPath. Relative XPaths begin with double forward slashes "//" and directly reference their corresponding elements, whereas absolute XPaths begin with a single forward slash followed by a reference to a root element and any additional elements along the path from the root element. In this example, the selectors are constructed using ID and text attributes, with the value of the ID attribute being an identifier of a list item (HTML tag <li>), and the value of the text attribute being the display text of an anchor (HTML tag <a>). The contents of each selector are enclosed between <locator> tags.

Figure 5:
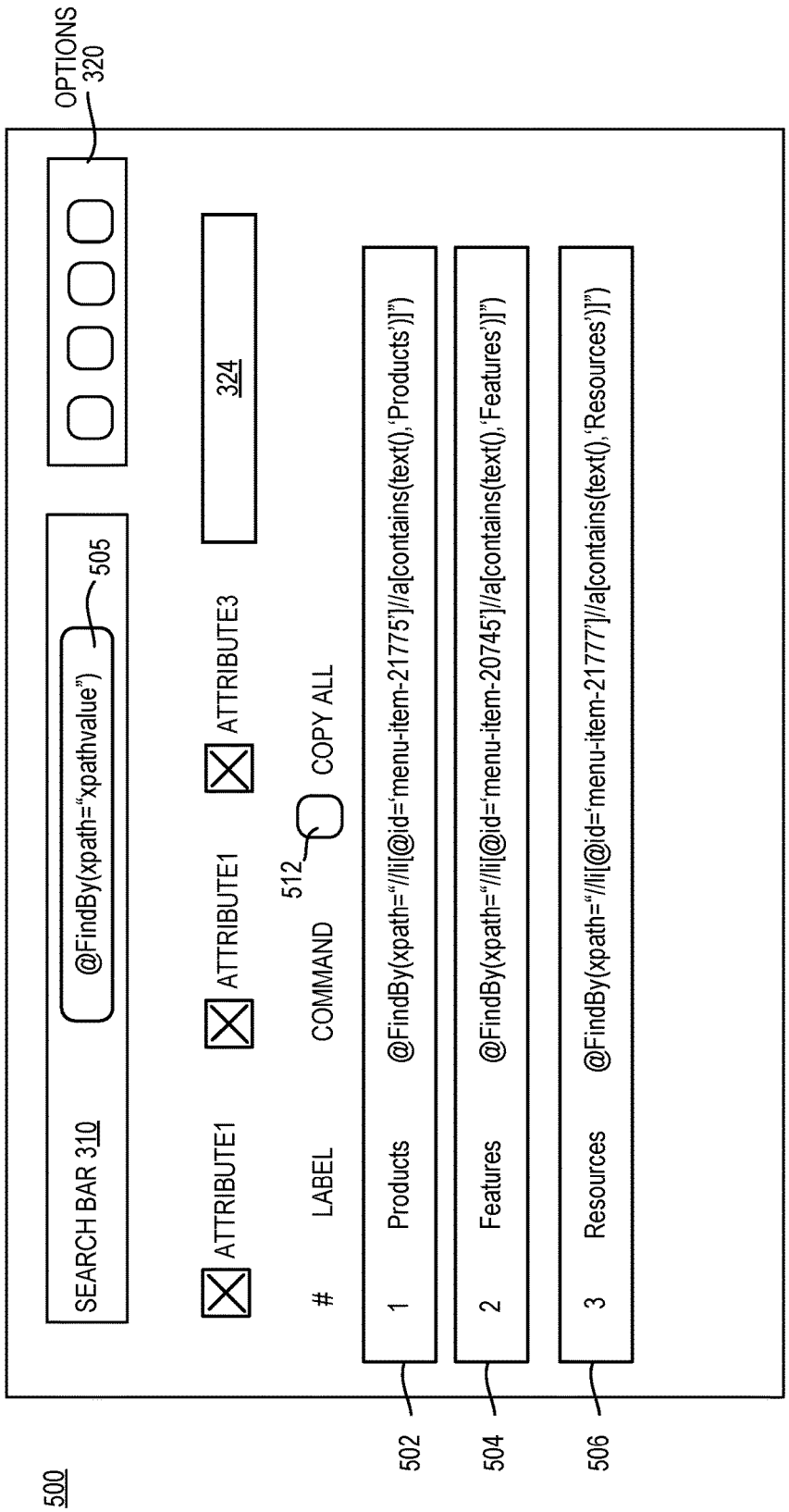
FIG. 5 shows an example of a user interface for generating software code containing selectors, according to some embodiments.

FIG. 5 shows an example of a UI 500 for generating software code containing selectors, according to some embodiments. The UI 500 includes some of the same items included in the UI 300 of FIG. 3 and may correspond to a user interface presented by the browser extension in response to user input of a command template 505 in the search bar 310. In this example, the command template 505 is based on a "FindBy" command. FindBy accepts a selector as an input parameter and is used to locate a corresponding web element. The user may configure the command template 505 to specify the selector for a particular element. Alternatively, as shown in the figure, the selector can be substituted with a keyword "xpathvalue". This keyword is recognized by the browser extension as a placeholder variable for any XPath selector regardless of content. Accordingly, the UI 500 displays the results of applying the FindBy command to every XPath selector in an input file. The input file can be any file containing a selector. For example, FIG. 5 shows results of applying the FindBy command to selectors in the file 400. In some instances, the input file contains a test script for testing functionality associated with webpage elements. The test script can be updated to include code fragments (discussed below) generated as a result of applying the FindBy command.

Inputting a command with "xpathvalue" as a parameter causes the browser extension to generate, for each XPath selector in the input file, a corresponding code snippet or fragment that includes the command formatted specifically for that XPath. For example, FIG. 5 shows that the FindBy command be applied to generate FindBy commands 502, 504, and 504 based on the selectors 402, 404, and 406, respectively. The command 502 can be executed as part of a test script written in Selenium programming language (Selenese), to find the web element associated with the selector 402. Similarly, the command 504 can be executed to find the web element associated with the selector 404, and the command 506 can be executed to find the web element associated with the selector 406. In this manner, the browser extension may generate not only selectors, but also code fragments that include or reference such selectors. This can save the user from having to manually write a separate command for each selector. As shown, the UI 500 may include an option 512 to copy all of the code fragments generated based on the template 505, e.g., to a clipboard for pasting into a test script. As with the selectors generated by the browser extension, the code fragments may also be exported to an output file for subsequent use.

FIG. 5 is merely one example of program code that can be generated by the browser extension. The browser extension may be configured to generate code fragments that perform any number of actions with respect to web elements, for example, code that reads a value of an element or code that simulates an action an end-user would perform (e.g., checking or unchecking a box). Further, the browser extension may be capable of generating code in multiple programming languages and/or for different testing frameworks.

FIG. 6 shows an example of test code 600 containing selectors, according to some embodiments. The test code 600 includes code fragments 602, 604, and 606 generated by the browser extension. Code fragments 602 and 604 include commands for finding an element based on a corresponding selector and obtaining the text associated with the element.

In this example, the code fragments are based on the "driver.findElement" command, which operates similarly to FindBy. Unlike the code fragments 602 and 604, the code fragment 606 is only configured to find the element associated with the selector 406 (the element named "resources"). The code fragment 606 can be generated using the template-based technique described above in conjunction with FIG. 5, for example, using the command template: driver.findElement(By.xpath("xpathvalue")). The code fragment 606 can be modified to perform an action similar to the code fragments 602 and 604, e.g., by selecting a "getText( )" option from a menu 612. The test code 600 and the menu 612 can be presented through a user interface provided by the browser extension (e.g., UI 500). Alternatively, the menu 612 may presented through a user interface of a separate software application such as a text editor or the software development program 126 in FIG. 1. Thus, the code fragments generated by the browser extension may be edited within the browser extension itself or in another application.

As shown in FIG. 6, the menu 612 can include options for modifying the code fragment 606 to perform other actions such as obtaining the size or location of the element named "resources". Thus, a developer or other user may customize the code fragments generated by the browser extension to complete a test script. As discussed in further detail below, the browser extension can generate code fragments for a substantial portion of a test script with minimal user input. In some instances, the user need only perform some basic editing to finalize the test script, e.g., by manually adding a header section with a "#include" directive for incorporating the contents of a header file.

In some embodiments, the browser extension may be configured to parse one or more webpages and generate code fragments tailored to functionality supported by the various types of elements in the webpage(s). The browser extension can generate such code fragments for every element of the webpage(s), e.g., in automated response to a single click, or for individual elements. To generate such code, the browser extension may determine whether an element belongs to one of several predefined classes such as clickables, selectables, or enterables. Examples of clickables include hyperlinks and buttons. Examples of selectables include radio buttons and pull-down menus. Examples of enterables include blank or pre-populated text boxes. Non-interactive elements may be classified, e.g., as being readable or displayable. Depending on the class an element belongs to, the element may be accessed or manipulated in any number of ways. For example, to test a clickable element, a test script could include a command to simulate a mouse click on the element. Similarly, a command to enter a valid or invalid input pattern could be used to test an enterable. For instance, a numerical string could be input to a text box designed to receive non-numeric input to test the webpage's response.

The browser extension can automatically generate a set of possible commands in accordance with the class of each element. Additionally or alternatively, the browser extension may generate commands that are specific to a particular type of element within a given class, e.g., commands that are only applicable to radio buttons. The resulting commands may be displayed to the user and/or saved to an output file. The browser extension may also present the user with options to specify which commands to generate for a given class of element.

Figure 7:
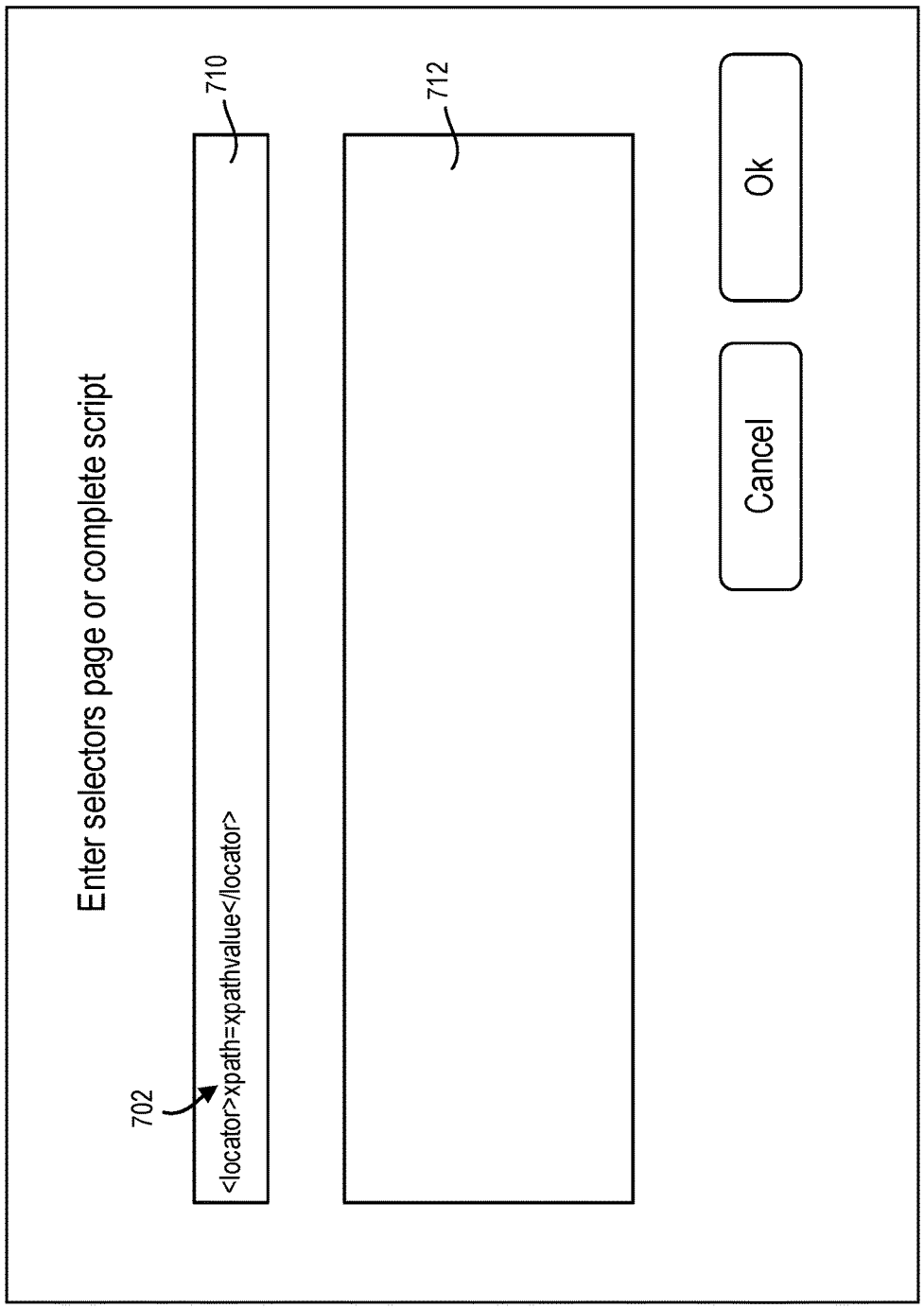
FIG. 7 shows an example of a user interface for searching for matching selectors, according to some embodiments.

FIG. 7 shows an example of a UI 700 for searching for matching selectors, according to some embodiments. UI 700 includes a first input box 710 that accepts a search query 702 for execution against the contents of a second input box 712.

The second input box 712 can include only selectors (e.g., one or more selectors copied from the file 400) or selectors embedded in a test script (e.g., the test code 600). In example shown, the query 702 is formatted in a manner similar to the command template 505 in FIG. 5, using the keyword "xpathvalue", in order to capture all XPath selectors contained in the input box 712. In some embodiments, the query 702 may be executed on the contents of a file instead of the contents of the input box 712.

FIG. 8 shows an example of a UI 800 displaying search results, according to some embodiments. Like the search results in FIG. 3, the search results in the UI 800 include a list of selectors. In the case of the UI 800, the search results may be generated based on a search for all XPaths in a test script, e.g., using the query 702 in FIG. 7. Such a search may be performed as part of website maintenance. For example, a developer may use the browser extension to obtain a list of all XPaths contained in a test script and to determine whether the XPaths extracted from the test script are still valid after a webpage has been updated. One mechanism by which the browser extension can indicate that a selector that is no longer valid is a counter. Here, the UI 800 includes counters 840 similar to the counters 340 in FIG. 3. Some of the selectors included in the search results may be non-unique. For example, a counter 840-A indicates that there are 153 instances of the XPath "//div", and a counter 840-B indicates that there are 74 instances of the XPath "//a". Other selectors are unique, as indicated by counters 840-C and 840-E, corresponding to the selectors 402 and 406 in FIG. 4.

In the example of FIG. 8, counter 840-D indicates that there are zero instances of the selector 404. This could be caused by a webpage update. When a webpage is updated, e.g., by adding, removing, or modifying elements, selectors that were previously generated may no longer work as addresses for their corresponding elements. Thus, a test script including the selector 404 would no longer function as intended. To fix this error, the selector 404 would need to be rewritten to reflect the updated webpage. The browser extension may be configured to identify webpage elements for which there are no corresponding selectors. For example, the browser extension could highlight any element that has no corresponding selector (e.g., in window 204). Similar annotations can be made in a DOM view (e.g., window 206). Accordingly, the browser extension can be used to identify selectors that are no longer valid and to identify elements that may require selectors.

Figure 9:
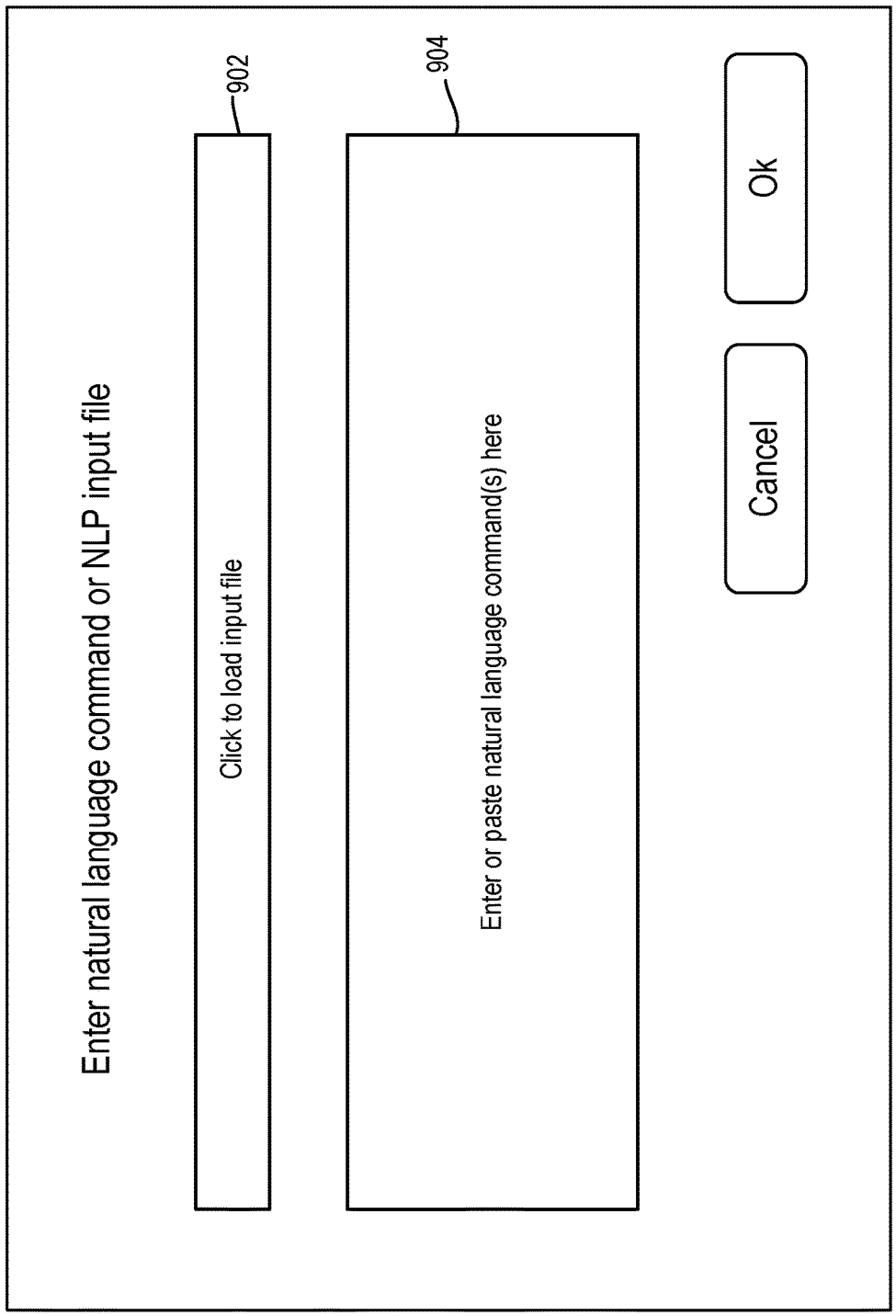
FIG. 9 shows an example of a user interface for inputting natural language statements, according to some embodiments.

FIG. 9 shows an example of a UI 900 for inputting natural language statements according to some embodiments. UI 900 can be used to obtain input for a natural language processing (NLP) agent. For example, the browser extension may include a software-based NLP agent configured to recognize input statements relating to selectors or, more generally, input statements in the web application testing domain. The input statements can be formatted as utterances in English or some other natural language. The NLP agent can be implemented using an artificial intelligence model, for example, through training or customizing an off-the-shelf NLP library. Prior to training or customization, the NLP agent may have a basic understanding of grammar, proper sentence construction, and dictionary definitions.

The NLP agent can be configured to understand the meaning of statements describing actions that can be performed with respect to web elements. For example, the NLP agent can be trained to understand what "click on button" or "uncheck box" means. Training can be performed using a training set of statements. With sufficient training examples, the NLP agent can build an association between synonymous input statements, e.g., to learn that "go to website" and "enter website" are synonymous. The NLP agent may also learn to identify web elements that are the subject of statements, e.g., that "get relative XPath for products" refers to the element named "products".

As shown in FIG. 9, the UI 900 can include an option 902 to load an input file containing natural language formatted statements. FIG. 11 (discussed below) shows an example of such an input file. UI 900 can also include an input box 904 for entering one or more natural language statements directly. Using the NLP agent, the browser extension can analyze the input statements to generate corresponding code fragments more efficiently, with less writing of program code on the part of the user. Another advantage to NLP-based code generation is that the code can be generated around a specific test case, shifting focus away from the elements that reside on a webpage. Although code can be generated to test individual elements or a group of related elements on the same webpage in isolation, generating code involving a sequence of actions on elements spanning multiple webpages would more accurately reflect how an end-user might interact with such elements.

Figure 10:
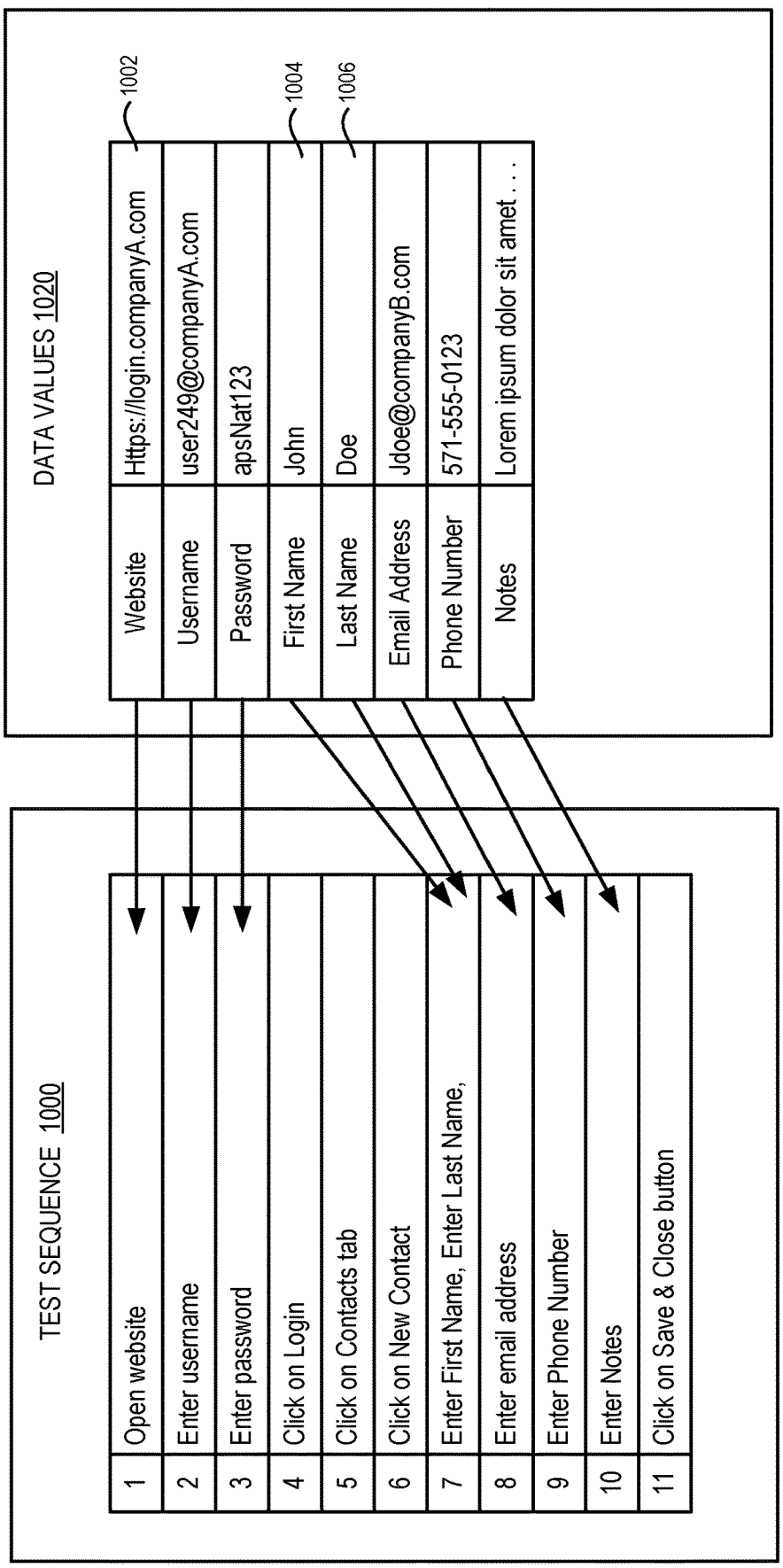
FIG. 10 shows an example of a test sequence, according to some embodiments.

FIG. 10 shows an example of a test sequence 1000, according to some embodiments. The test sequence 1000 is an ordered sequence of steps written in natural language format. The test sequence 1000 begins with opening a website "Open website" and involves steps that an end-user might perform in connection with adding a new contact to a personal list of contacts. As shown in the figure, each step can be represented by a corresponding statement describing one or more actions. For example, the contact's first name and last name are entered in step 7.

FIG. 10 also shows data values 1020 that may be supplied as input for executing the test sequence 1000. For example, a value 1002 may represent the URL of the homepage of the website, a value 1004 may represent the contact's first name, and a value 1006 may represent the contact's last name. The data values 1020 can be integrated (e.g., hardcoded) into code generated based on the test sequence 1000. Alternatively, the browser extension may be configured to insert variables representing these data values into the test code. At runtime, the browser extension or other application executing the test code can import the data values 1020 from a data file. In this manner, the code generated by the browser extension may be reused during a subsequent test, e.g., a test performed after one or more webpages of the website have been updated. Thus, the test code can be applied to repeatedly test the website without having to rewrite the test code each time the website is modified.

In the example of FIG. 10, the natural language statements are high-level descriptions of steps that an end-user could perform. However, the statements are not in one-to-one correspondence with steps that a computer would take to achieve the same results. For example, a computer would locate a web element by its address before performing an action on the web element. To enable the browser extension to generate executable code, a test sequence can include natural language statements indicating what selectors to use, as shown in FIG. 11.

FIG. 11 shows an example of a test file 1100 containing natural language statements, according to some embodiments. The test file 1100 includes statements corresponding to the test sequence 1000 but written in a way that facilitates automated code generation. As shown, the statements in the test file 1100 refer to web elements by their selectors. For example, the browser extension may process a statement 1102 to generate a command (e.g., FindBy or driver.findElement) for locating an input box in which to enter a username, based on the relative XPath of the input box. Similarly, the browser extension may process a statement 1104 to generate a command for locating a button that can be clicked to log into the end-user's account, based on the button's CSS selector. As another example, the browser extension may process a statement 1106 to generate a command for locating a "Contacts" tab on a webpage displayed upon successful login, based on the tab's absolute XPath. Thus, the code generated based on the test file 1100 can include selectors determined by the browser extension. The test file 1100 may also describe actions with greater specificity than the statements shown in FIG. 10. For example, a statement 1110 specifies that the button to log in is clicked using a mouse action (e.g., left-click). By contrast, a statement 1112 specifies that the Contacts tab is clicked using a keyboard action (e.g., the Enter key). Such statements permit a user to precisely configure the behavior of a test script with less reliance on programming language knowledge. Further, the automatically generated code is guaranteed to be free of human errors such as spelling mistakes and incorrect syntax.

Figure 12B:
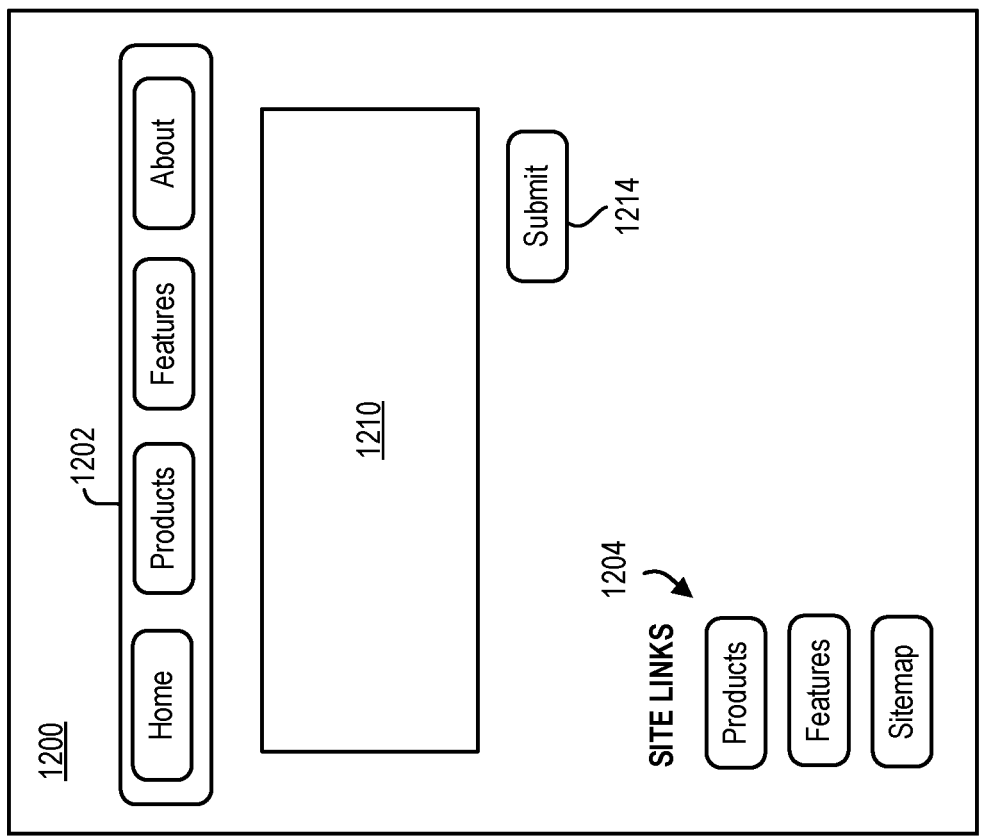
FIG. 12B shows example natural language statements for generating selectors based on the webpage in FIG. 12A.
Figure 12A:
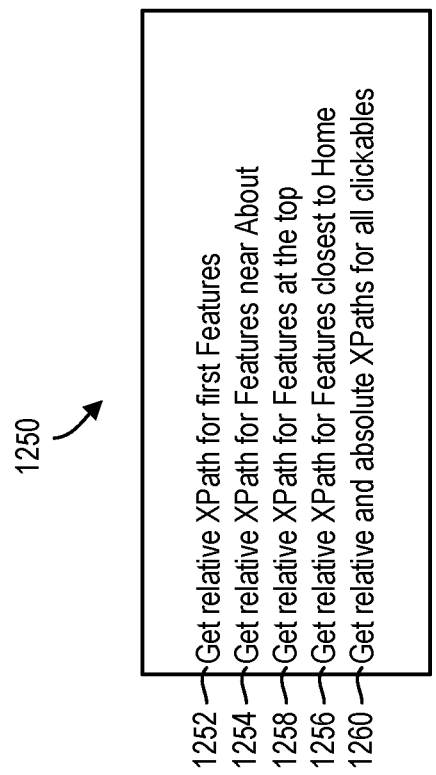
FIG. 12A shows an example of a webpage, according to some embodiments.

FIG. 12A shows an example of a webpage 1200, according to some embodiments. Together with FIG. 12B, FIG. 12A illustrates the ease with which selectors can be generated for specific webpage elements based on natural language input. The discussion of FIGS. 12A and 12B is limited to natural language statements for generating selectors. However, the same approach may be used to generate program code that operates on web elements. Webpage 1200 includes a navigation menu 1202 at the top of the webpage. The menu 1202 can include links to different sections of the webpage and/or other webpages. In the example shown, menu 1202 includes links displayed as "Home", "Products", "Features", and "About". In addition to menu 1202, the webpage 1200 may include other interactive elements such as an input form with a text box 1210 and a submit button 1214. Although the elements of the webpage 1200 are uniquely addressable, some elements may share the same attribute. For example, FIG. 12A shows that the webpage includes site links 1204 mapped to the same destinations as links in the menu 1202. Thus, elements having the text attribute "Features" could appear multiple times throughout the webpage. Further, such elements may be distributed across sections that are not simultaneously visible. For example, a user may have to scroll to the bottom of the webpage to see the site links 1204.

FIG. 12B shows example natural language statements 1250 for generating selectors based on the webpage 1200. As discussed above in reference to FIG. 12A, elements can share the same attributes. Therefore, it may not be sufficient to specify the value of an attribute as part of a natural language statement. For example, if the statement "Get relative XPath for Features" were input, the NLP agent may be unable to determine whether the user intended to specify the Features link in the menu 1202 or the Features link in the site links 1204. More detailed statements can be used to unambiguously identify the subject element. For example, a statement 1252 may reference the order in which the element occurs ("first Features"). Alternatively, a statement 1254 may reference the location of the element relative to another element ("Features near About"). Statement 1256 is a similar example ("Features closest to Home"). Another possibility is to indicate the general location of the element on the webpage, as shown in statement 1258 ("Features at the top"). Thus, the NLP agent can be configured to recognize that statements 1252, 1254, 1256, and 1258 are equivalent. The NLP agent can do so because the browser extension is capable of processing the DOM to determine the structure of the webpage 1200 and the manner in which the elements are arranged. Further, the NLP agent may be configured, e.g., through training, with an understanding of terminology relating to web technology. For instance, the meaning of the term "top" in the context of a webpage.

In addition to generating selectors (or code containing selectors) for individual elements, natural language input can be used applied to do the same with respect to groups of elements, e.g., elements belonging to the same class. For instance, the browser extension could generate relative and absolute XPaths for all clickable elements on the webpage 1200 based on a statement 1260. Similarly, natural language input could be used to obtain selectors and/or program code for elements across multiple webpages (e.g., an entire website) in a single pass.

As indicated above, the elements that are the subject of natural language statements can be in different locations so as not to be visible simultaneously. Based on the example statements in FIG. 12B, it may be inferred that a user providing such statements has a sufficient awareness of the layout of the webpage 1200, e.g., so as to know that the Features link in the menu 1202 is the first occurrence of an element with the text attribute "Features". However, this is not always the case. A webpage may be so dense, or similar elements so spread out, that the user is unaware there are multiple instances of elements sharing the same attribute. Consequently, the user may provide a statement that fails to unambiguously identify the element the user has in mind. When this occurs, the browser extension can alert the user by flagging elements returned in response to the statement. For example, the browser extension may use highlighting (e.g., background coloring or outlining) to point out the elements identified by the user's statement, similar to FIG. 2. Accordingly, the browser extension may treat the statement as a search query that returns one or more matching elements or DOM nodes. The user could review and cycle through the results to manually select the element or its corresponding node. Alternatively, the flagging of the elements could provide the user with sufficient context to revise the statement and make it more specific.

The statements 1250 can be saved to a file for reuse with subsequent iterations of the webpage 1200, e.g., the test file 1100. In this way, the statements 1250 can be applied to generate updated selectors and/or updated code for use in testing the webpage 1200, and the statements 1250 need not be rewritten from scratch each time, at least with respect to elements that existed in the earlier version of the webpage 1200. For example, if the webpage 1200 is modified to add another link called "Help" in the menu 1202, statements referring to existing elements such as the Features link would still be applicable. The user could optionally add another statement directed to the Help link, e.g., "get absolute XPath for Help", but statements already in the file could remain unchanged.

The browser extension may generate one or more output files based on the natural language statements in an input file. For example, the browser extension can produce a single file containing code fragments for each page of a website, organized according to webpage. Alternatively, the browser extension may generate a separate output file for each webpage. The code contained in the output file(s) could then be executed, e.g., to evaluate functionality associated with newly added elements or to verify that functionality associated with existing elements remains intact.

Test scripts generated with the aid of the browser extension can be executed manually or in an automated fashion. In some embodiments, the browser extension may include a scheduling feature that permits a user to specify when a test script is to be executed, e.g., at a specific time and date, at a recurring interval, and/or in response to certain events. The browser extension may be configured to execute the test script with no or minimal user intervention. For example, the user may only specify which test script to execute (which can be done in advance via scheduling) and the data to use for executing the test script (e.g., a file containing the data values 1020 in FIG. 10).

Figure 13:
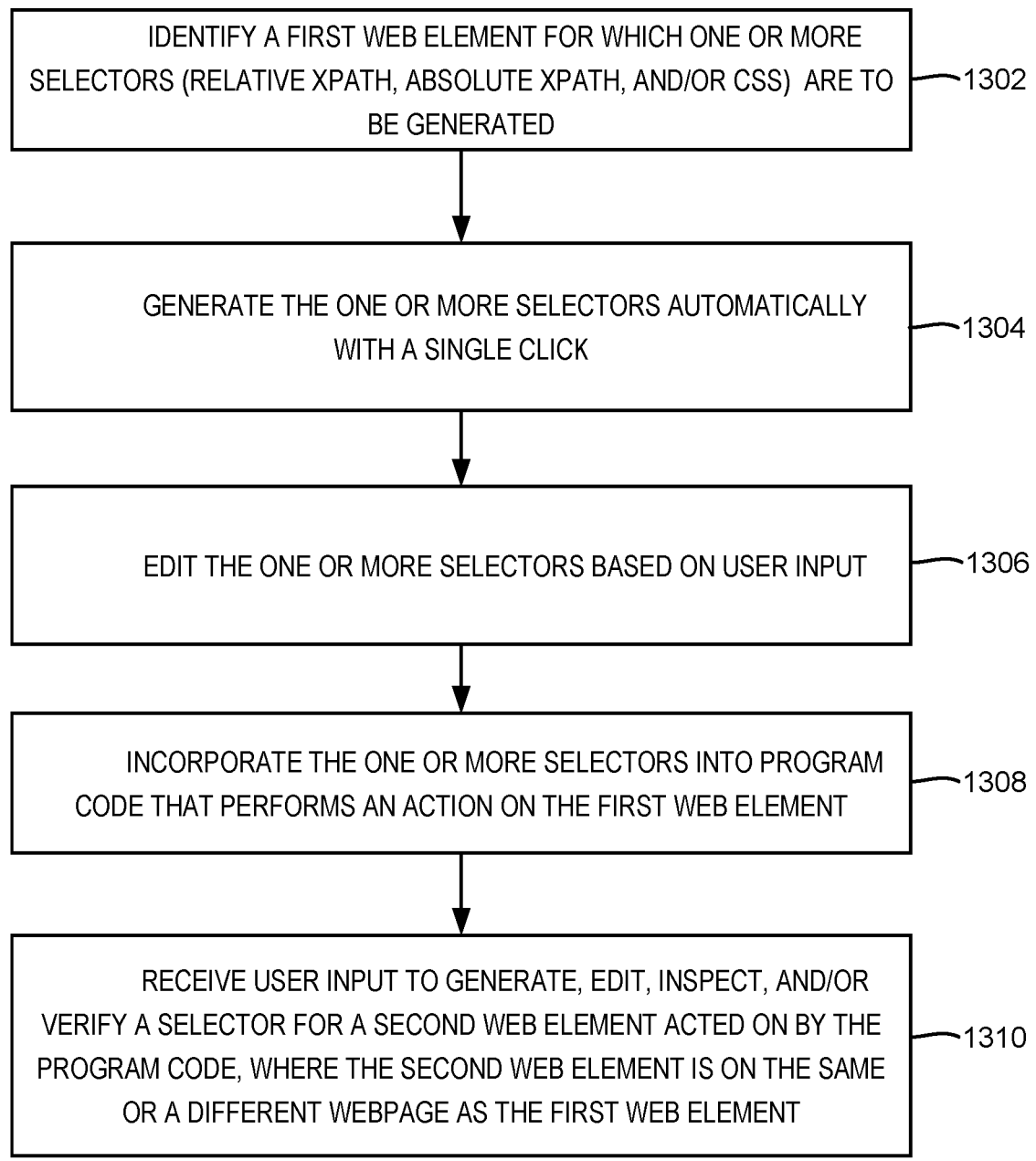
FIG. 13 shows a flow diagram of an example process for generating program code containing selectors, according to some embodiments, according to some embodiments.

FIG. 13 shows a flow diagram of an example process 1300 for generating program code containing selectors, according to some embodiments. The functionality described with respect to the process 1300 can be implemented by a web browser extension configured in accordance with one or more examples discussed above. The process 1300 includes functionality responsive to user input. The browser extension may be installed as an add-on to a web browser on a computing device or system operated by the user providing the input.

At 1302, a first web element for which one or more selectors are to be generated is identified. The first web element can be any element rendered as part of a webpage being tested or developed. The one or more selectors can include a relative XPath, an absolute XPath, a CSS selector, or any combination thereof. The first web element may be identified based on user input. For example, referring to FIG. 2, the user may select element 222-A as the first web element by clicking on the element 222-A as displayed in the window 204. Alternatively, the user may select a DOM node associated with the first web element, e.g., node 212-A. In some instances, the first web element is automatically identified by the browser extension, for example, as being a member of a group of elements for which selectors are to be generated. As discussed above, the browser extension may be configured to automatically generate selectors for a particular class of element or for every element on a webpage and, in some instances, across different webpages.

At 1304, the one or more selectors are generated automatically with a single click. The single click can be applied to a button in a user interface of the browser extension. In some implementations, the single click is applied in conjunction with identifying the first web element, e.g., clicking the first web element to identify it in 1302. The browser extension can generate the one or more selectors based on at least one attribute of the first web element. As discussed above, the browser extension can generate a selector based on default/recommended attributes or user-specified attributes.

At 1306, the one or more selectors are edited based on user input. The editing may involve, changing a selector type, lengthening a selector (e.g., based on an additional attribute), shortening a selector (e.g., to remove an attribute), deleting an entire selector, or some other modification to the contents of the one or more selectors.

At 1308, the one or more selectors are incorporated into program code (e.g., a test script) that performs an action on the first web element. The selectors can be incorporated manually by copying and pasting the one or more selectors into a file containing the program code. Alternatively, as discussed above, the browser extension can generate code fragments containing selectors. Accordingly, the functionality in 1308 can be performed in an automated fashion and concurrently with generating the one or more selectors in 1304. The action performed by the program code can be any action supported by the first web element. Examples of possible actions include reading a value, writing a value, and setting a state (e.g., checked/unchecked). In general, the program code can simulate any action that an end-user viewing the webpage could perform with respect to the first web element and through an input device (e.g., a mouse and/or keyboard).

At 1310, the browser extension receives user input to generate, edit, inspect, and/or verify a selector for a second web element acted on by the program code. The second web element can be an element on the same webpage as the first web element or on a separate webpage (e.g., a different page of the same website). The selector for the second web element may be generated together with the one or more selectors for the first web element or independently. The browser extension can automatically verify the selectors at the time that the selectors are generated and/or after the selectors have been incorporated into the program code. For example, the functionality in 1310 may involve the browser extension analyzing the program code to determine that the selector for the second web element is no longer valid due to a change in the webpage.

Figure 14:
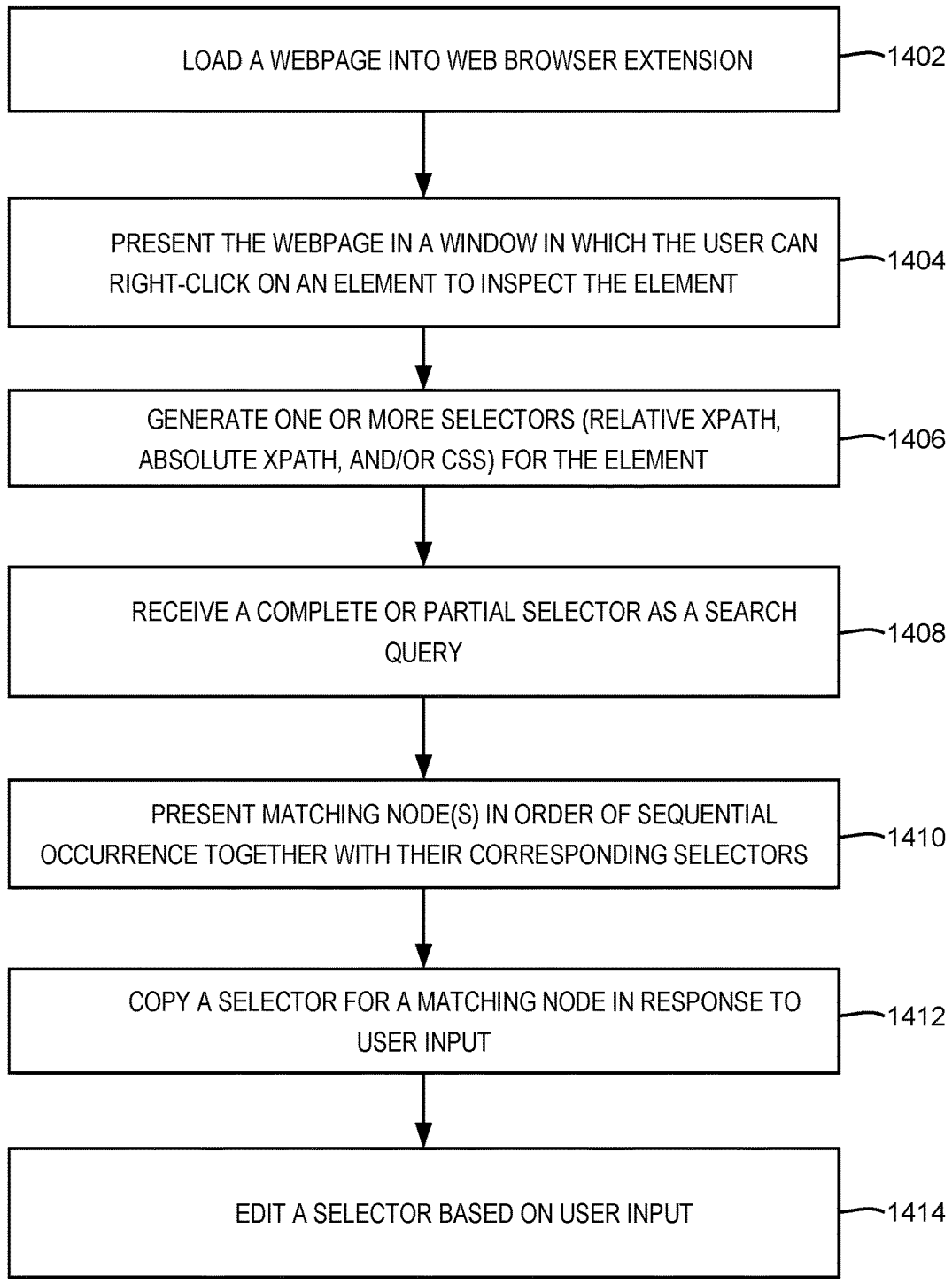
FIG. 14 shows a flow diagram of an example process for using a web browser extension, according to some embodiments.

FIG. 14 shows a flow diagram of an example process 1400 for using a web browser extension, according to some embodiments. The process 1400 can be performed after installing the browser extension as an add-on to a web browser and begins at 1402 with loading a webpage into the browser extension. The webpage may have previously been loaded into the web browser itself, e.g., prior to installing the browser extension. In that case, the webpage may be reloaded after the browser extension is installed, e.g., during a restart of the web browser. Loading of the webpage into the browser extension may involve obtaining a corresponding DOM and communicating the DOM to the browser extension, e.g., through an application programming interface of the web browser.

At 1404, the webpage is presented in a window that permits the user to right-click on an element to inspect the element, e.g., window 204 in FIG. 2. The window presenting the webpage can be displayed together with a window presenting the DOM, e.g., window 206. As shown in FIG. 2, the browser extension may also have a corresponding window. In general, the user can right-click on any on-screen location to inspect the corresponding element. In response to the user choosing to inspect the element, the browser extension may scroll the DOM to display the corresponding node.

In some implementations, the browser extension is accessed via a menu or sidebar of the window in which the DOM is displayed. For example, the window 206 may include an "elements" tab showing the DOM nodes and a separate DevTool tab for toggling display of the browser extension. In one embodiment, the DevTool tab can be popped out as a standalone browser tab (e.g., another tab 215) or a new browser window. Alternatively, the DevTool tab may be pinned to a specific location in the current browser tab, e.g., as the window 202 within tab 215-B.

At 1406, the browser extension generates one or more selectors for the element being inspected. The browser extension may include options to specify which types of selectors to generate. For example, the user could choose to obtain only relative XPaths, only absolute XPaths, only CSS selectors, or a combination of different selector types. The browser extension generates each selector as a unique address by which the element can be located on the webpage. When generating selectors for multiple elements, the browser extension can display the selectors in accordance with the order in which the elements occur, e.g., as per the sequential occurrence of their corresponding nodes in the DOM. For example, in FIG. 5, the command 502 (which includes selector 402 from FIG. 4) is presented first because the node associated with the element named "products" occurs before the nodes associated with the elements named "features" and "resources". Ordered presentation of selectors can also be performed when displaying the results of a selector-based search, as discussed below.

At 1408, the browser extension receives a complete or partial selector as a search query. For example, the user may enter a selector pattern into the search bar 310 in FIG. 3. The browser extension evaluates the DOM against the search query to identify one or more matching nodes.

At 1410, the browser extension presents the matching node(s) in order of sequential occurrence, together with their corresponding selectors. For example, an ordered list of selectors may be displayed in the window 202. At the same time, the element represented by the first matching node (e.g., element 222-A) may be circled with a dashed outline on the webpage. Further, the first matching node (e.g., node 212-A) may be highlighted in a particular color. The browser extension permits the user to navigate to another matching node, e.g., using the tab or arrow keys. The user input to navigate to another matching node can be applied to any of the windows, and the other windows may scroll in synchronization. For example, if the user selects a second selector from window 202, the window 204 may scroll to show the element corresponding to the second selector, and the window 206 may scroll to show the node representing this element.

At 1412, the browser extension copies a selector for one of the matching nodes in response to user input. The user input to copy the selector can be a single click action applied to a button (e.g., a copy icon). Further, as discussed above, single-click copy can be performed with respect to a group of selectors, e.g., using a "copy all" button such as the option 512 in FIG. 5. The selector(s) can be copied to a clipboard maintained in program memory for pasting into a file, e.g., a file containing only selectors or a file containing code that references selectors.

At 1414, a selector is edited based on user input, e.g., input supplied after clicking an "edit" icon. The selector being edited can be any of the selectors displayed by the browser extension, e.g., one of the selectors generated in 1406. Thus, the user can modify the content of an automatically generated selector to suit the user's preferences, e.g., based on an additional or custom attribute not used when selector was initially generated. The edited selector can be copied and pasted in the same manner as in 1412.

Figure 15:
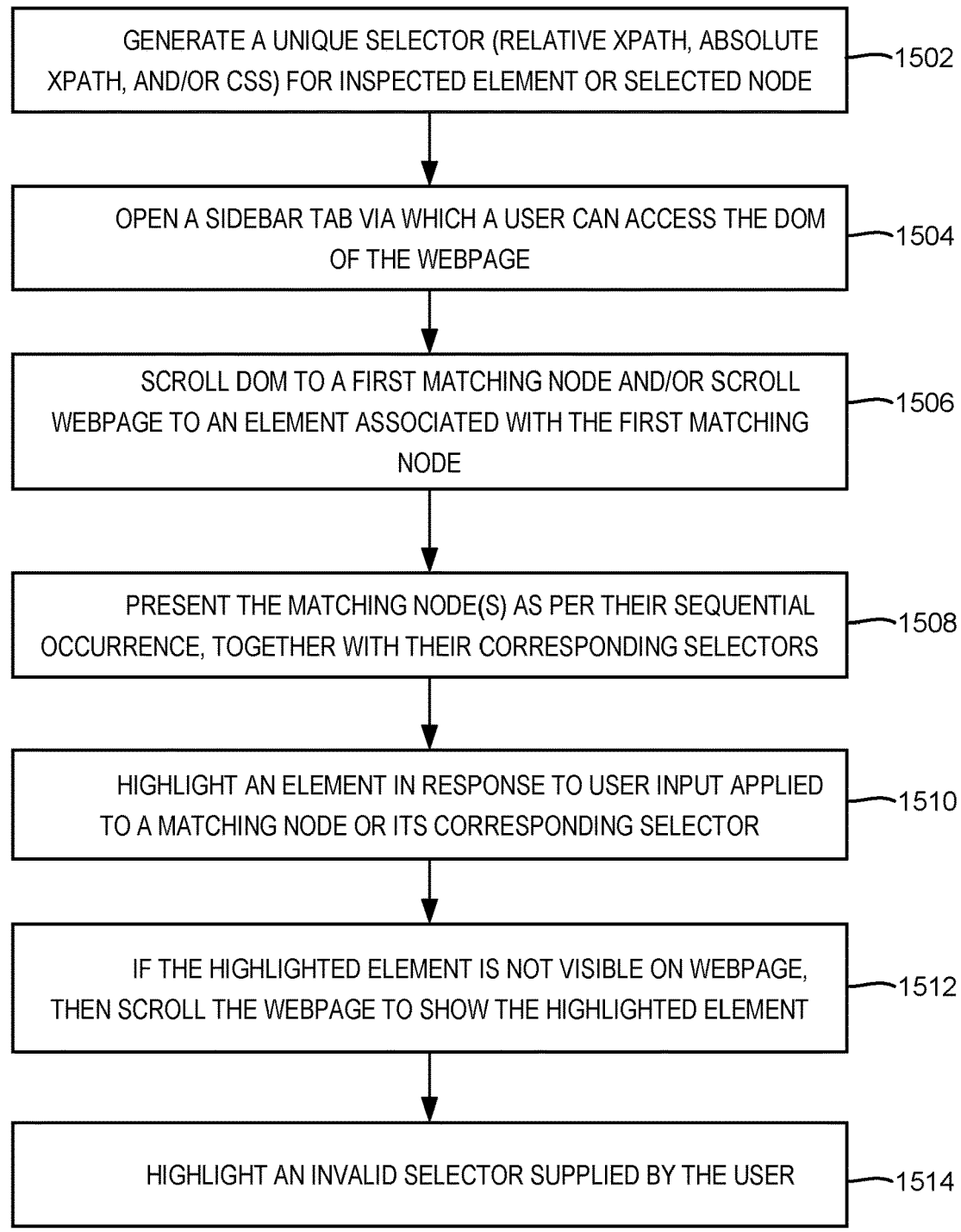
FIG. 15 shows a flow diagram of an example process for implementing a web browser extension, according to some embodiments.

FIG. 15 shows a flow diagram of an example process 1500 for implementing a web browser extension, according to some embodiments. The process 1500 includes functionality that can be performed by the browser extension in combination with functionality provided by a web browser, such as displaying a webpage. Thus, the process 1500 may involve communication between the browser extension and the web browser over an application programming interface.

At 1502, the browser extension generates one or more unique selectors (e.g., absolute XPath, relative XPath, and/or CSS) for an inspected element or selected node.

At 1504, a sidebar tab (e.g., ChroPath tab) is opened to provide a user with access to the DOM of the webpage. The sidebar tab can, for example, be opened within a DevTools panel provided by the browser extension. The sidebar tab can be used to access the DOM separately from an elements tab in which the DOM is displayed. For example, the elements tab may correspond to window 206, through which the DOM nodes may be viewed in full context. The user can inspect individual elements in the elements tab. The sidebar tab may correspond to window 202, which may be configured to display a subset of matching or selected nodes, e.g., matching node 360 in FIG. 3. The user can write/edit selectors presented in the sidebar tab and/or use the sidebar tab to evaluate selectors, e.g., based on a search query.

At 1506, the DOM is scrolled to an element associated with a first matching node. Additionally or alternatively, the webpage may be scrolled to an element associated with the first matching node. Whether scrolling is performed depends on if the node/element is currently visible. For example, the DOM can be scrolled when the first matching node is not in a visible area of the DOM. Similarly, the webpage can be scrolled when the element associated with the first matching node is not in a visible area of the webpage. A dashed outline in a first color (e.g., blue) can appear around all the matching elements in the webpage. The matching elements can be highlighted in other ways depending on implementation.

At 1508, the browser interface presents the matching node(s) as per their sequential occurrence, together with their corresponding selectors. For example, the elements tab may initially be scrolled to the first matching node. The sidebar tab can display the first matching node together with one or more selectors corresponding to the matching node(s).

At 1510, one of the elements is highlighted in response to user input applied to a matching node or its corresponding selector. The highlighting can differ from the way in which other matching nodes are highlighted in order to call out the element corresponding to the node/selector indicated by the user. For example, upon mouse hover over a matching node, the dashed outline around the corresponding element can change shape and/or color (e.g., into dotted orange-red) to highlight the corresponding element on the webpage. A similar change in the dashed outline may occur in response to mouse hover over the selector associated with the corresponding element.

At 1512, if the element highlighted in 1510 is not visible on the webpage, then the webpage can be scrolled to show the highlighted element, e.g., upon detecting mouse hover over the matching node.

At 1514, the browser extension highlights an invalid selector supplied by the user. For example, the browser extension can detect user input of an improperly formatted XPath or CSS pattern, or a pattern that fails to address any element on the webpage. The user supplied selector may be entered into an input box, e.g., the search bar 310 in FIG. 3. As such, the input box may be highlighted (e.g., in red color) to call attention to the fact that the user supplied selector is invalid. In some implementations, an error message may also be displayed, e.g., "Error, no matching elements" in place of the message 303.

Figure 16:
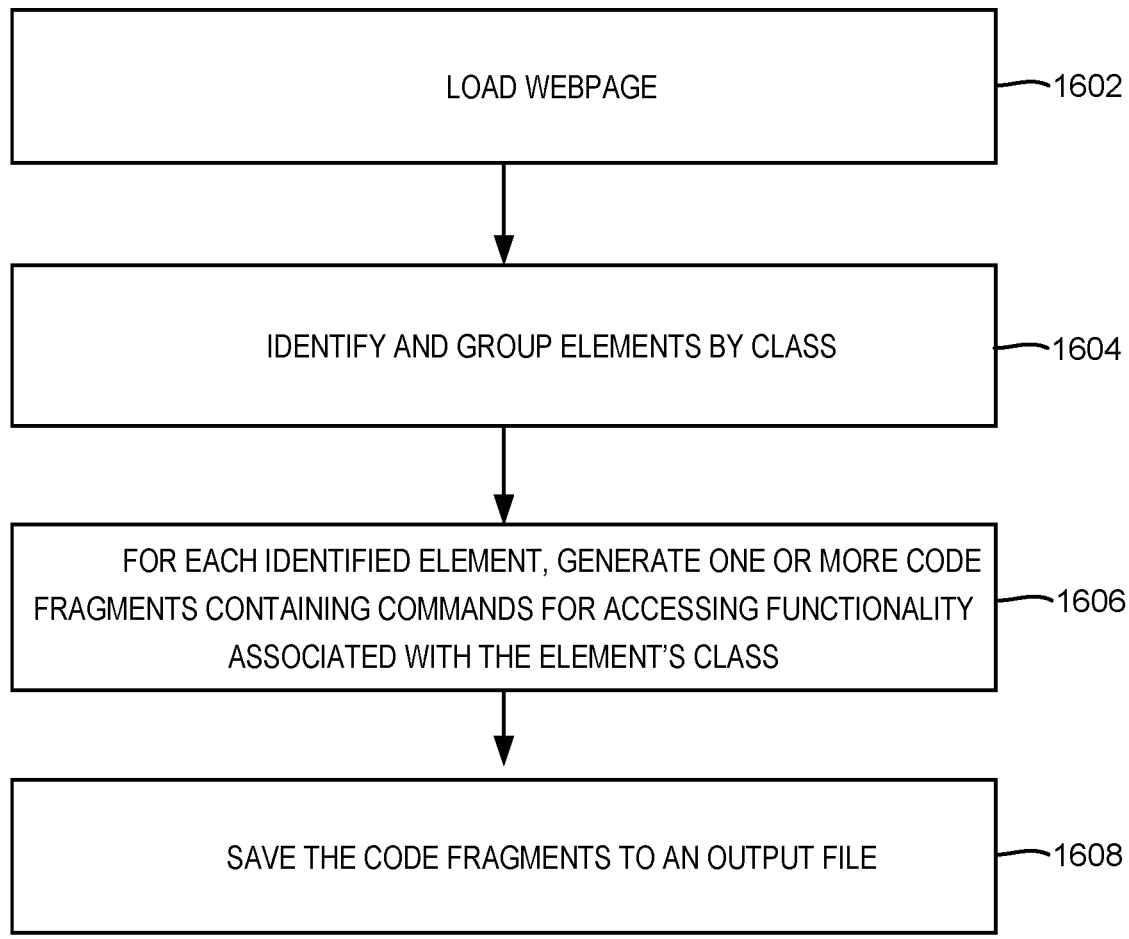
FIG. 16 shows a flow diagram of an example process for generating program code through a web browser extension, according to some embodiments.

FIG. 16 shows a flow diagram of an example process 1600 for generating program code through a web browser extension, according to some embodiments. The process 1600 begins at 1602 with loading a webpage. The browser extension may provide a user interface through which a user can select one or more webpages for loading. In some instances, multiple webpages may be loaded for concurrent processing. For example, to generate code across different pages of a website, a user may load the entire website into the browser extension. The loading of the webpage(s) may involve obtaining a corresponding DOM for each webpage and analyzing the contents of the DOM to determine the structure of the webpage, including the elements on the webpage and the relationships between elements.

At 1604, the browser extension identifies and groups elements by class. Elements can be grouped into different classes based on the types of actions that can be performed on the elements. For example, as described earlier, the web elements can be classified as being clickable, selectable, enterable, readable, etc. Thus, elements that can be acted upon in the same way may be grouped together in preparation for generating code to perform these actions. In some instances, an element may be grouped into multiple classes. For example, an element could be both clickable and readable. The grouping can be performed for all elements in a webpage or across multiple webpages. Each class can encompass one or more types of web elements. In some instances, a class may be limited to a single type of web element.

At 1606, the browser extension generates, for each identified element, one or more code fragments containing commands (program instructions) for accessing functionality associated with the class of the element. Thus, code fragments generated for clickable elements may include commands that differ from code fragments generated for enterable elements. The code fragments may be generated in the form of executable program code containing selectors for the elements acted on. The browser extension can generate the selectors in a similar manner as when generating selectors independently of program code. For example, the browser extension may determine an XPath or CSS selector pattern based on one or more attributes, including automatically selected attributes (e.g., default attributes or attributes that the browser extension recommends for producing a unique selector), attributes selected by the user, or a combination of user-selected and automatically selected attributes. The generation of the code fragments in 1606 may be performed based on a single click or similar user input.

At 1608, the browser extension saves the code fragments to an output file. For example, the browser extension may generate a single output file containing code fragments separated according to webpage and in order per the sequential occurrence of the elements. Alternatively, the code fragments could be ordered according to element attribute, e.g., in alphabetical, numeric, or alphanumeric order based on name, ID, etc. The browser extension could also generate a separate output file for each webpage. In this manner, a user can be provided with ready-to-use code for building a test script, and the user can quickly retrieve any code fragments of interest due to the logical arrangement of the code fragments.

Figure 17:
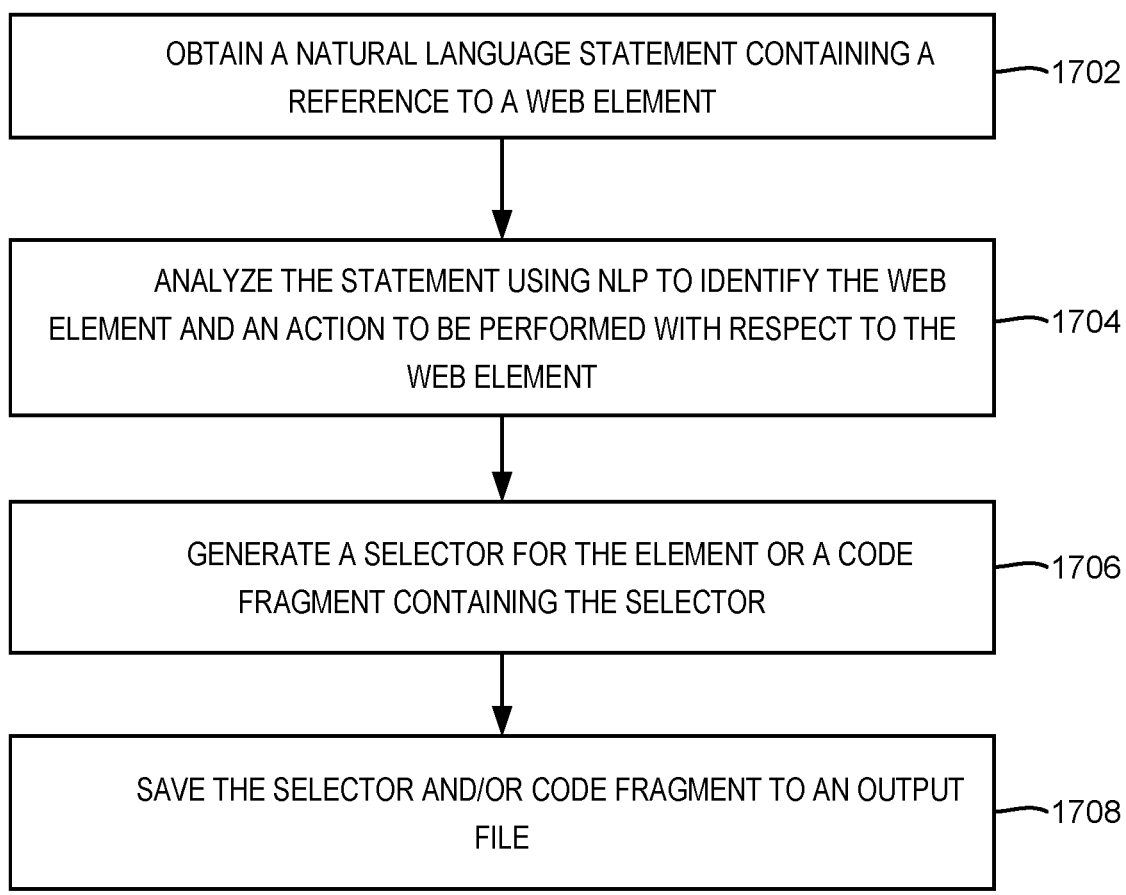
FIG. 17 shows a flow diagram of an example process for using natural language input to generate selectors or program code containing selectors, according to some embodiments.

FIG. 17 shows a flow diagram of an example process 1700 for using natural language input to generate selectors or program code containing selectors, according to some embodiments. When applied to generate program code, the NLP-based technique depicted in FIG. 17 is advantageous in terms of code generation efficiency since the resulting output may be a substantially complete test script. Further, as discussed earlier, NLP can be used to generate code on a test case basis, freeing the user (e.g., developer or tester) to focus on how an end-user might interact with a website as opposed to testing individual elements or individual webpages. Thus, tests can be designed to evaluate website functionality (e.g., user registration, an e-commerce transaction, or some other process) from beginning to end, traversing all webpages and web elements that an end-user would encounter. The browser extension can generate code to simulate the complete end-user interaction, and any selectors that may be needed to act upon the web elements would be generated as part of the code itself.

At 1702, the browser extension obtains a natural language statement containing a reference to a web element. The natural language statement can be a standalone statement, e.g., a complete or partial sentence entered into the input box 904 in FIG. 9. Alternatively, the functionality in 1702 may involve obtaining multiple statements, e.g., a set of statements that collectively form a test sequence. Thus, the input statement(s) can be prepared in advance or composed at the time of code generation.

At 1704, the statement is analyzed using NLP to identify the web element and an action to be performed with respect to the web element. The analysis may involve inputting the statement to an NLP agent, e.g., an agent built into the browser extension. The NLP agent can parse the statement to tag and group together words according to their corresponding parts-of-speech (e.g., noun, verb, pronoun, adjective, preposition) and grammatical case (e.g., subject, object, possessive). Such processing may be performed as part of syntactic analysis of the statement. The NLP agent may also perform semantic analysis, e.g., at a word level and/or sentence level, to determine the meaning of statement. Thus, the NLP agent could identify the web element as corresponding to a subject of the statement and the action to be performed as corresponding to a verb contained in the statement.

The NLP agent may perform rule-based processing and/or use machine learning to identify the web element and the action. Rule-base processing may, for example, involve pattern-matching against a regular expression (regex). Machine learning may involve pretraining the NLP agent to infer which element among a set of candidate elements (e.g., every element on a webpage) is most likely and, similarly, which action among a set of candidate actions is most likely. For example, the NLP agent may compute a confidence score for each candidate element and each candidate action. The NLP agent can rank the candidates based on score and select the highest-scoring element and the highest-scoring action. In some instances, the browser extension may request user input for disambiguating the results produced by the NLP agent. For example, if the difference between the scores of the highest ranking and second highest ranking elements does not exceed a threshold value, the browser extension may prompt the user to choose between the two candidate elements. The browser extension can highlight the candidate elements on the webpage and/or the corresponding DOM nodes to aid the user in determining which element is the one referred to in the statement.

At 1706, the browser extension generates a selector for the element identified in 1704 or a code fragment containing the selector. The selector or code fragment can be generated based on the identified action. For instance, the action identified in 1704 may be a request to obtain a selector, e.g., when the statement is "get relative XPath for Features". In some instances, the identified action is an action to be implemented through program code, e.g., when the statement is "Click on Login". In such instances, the browser extension may generate a code fragment including one or more commands or program instructions that are executable to perform the action.

At 1708, the browser extension saves the selector or code fragment to an output file. The output file can be a source file readable by the browser extension or a separate software development program. When the output file contains program code, the output file may be compiled and executed. The output file can be executed in connection with a live or published version of a webpage. Alternatively, the output file can be used to test the webpage prior to deployment.

Figure 18:
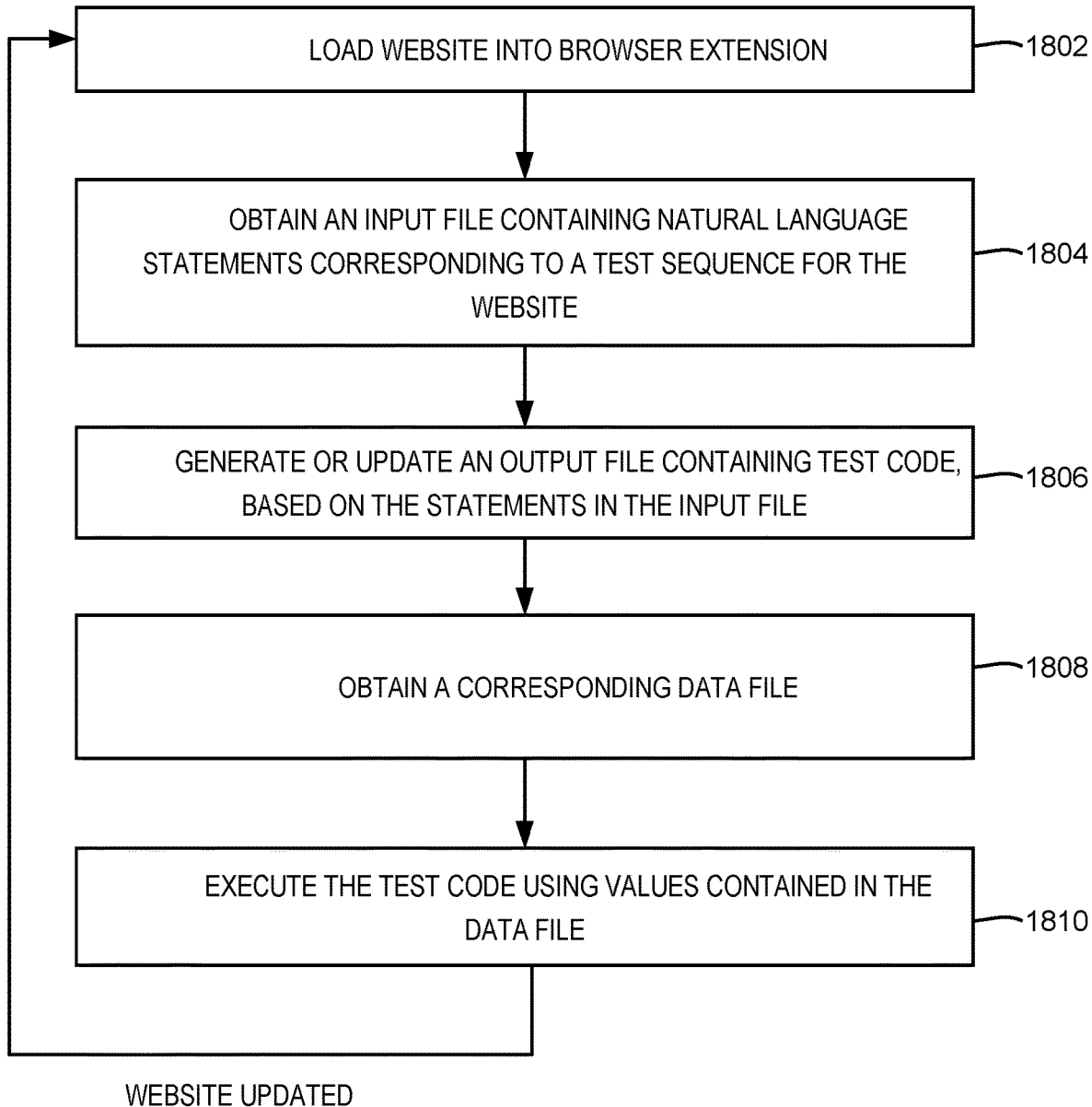
FIG. 18 shows a flow diagram of an example process for maintenance testing of a website, according to some embodiments.

FIG. 18 shows a flow diagram of an example process 1800 for maintenance testing of a website, according to some embodiments. The process 1800 can be performed repeatedly to ensure that the website functions as designed over the course of updates to the website. For example, the process 1800 may be performed after adding new content or changing a page layout. At 1802, the website is loaded into a browser extension. The loading in 1802 can be performed in a similar manner to the loading in 1402 of FIG. 14.

At 1804, the browser extension obtains an input file containing natural language statements corresponding to a test sequence for the website. As discussed above, such a test sequence may involve actions performed with respect to elements across different webpages.

At 1806, the browser extension generates or updates an output file containing test code. The output file can be generated or updated according to the process 1700 in FIG. 17. In some instances, the output file may include manually written portions, for example, program code in a header or footer, or user-supplied annotations. The browser extension can detect and preserve manually written portions while updating portions that were automatically generated. For example, the browser extension may update a selector in the test code to reflect the website as loaded in 1802. The updating of the output file may involve overwriting the existing selector without otherwise changing the code referencing the selector. Further, code can be added or deleted in correspondence with changes in the input file. For example, if the output file was generated from an earlier version of the input file and the input file obtained in 1804 includes a new statement, the browser extension can append a code fragment generated based on the new statement. Alternatively, a new input file may be generated each time an input file is obtained in 1804.

At 1808, the browser extension obtains a corresponding data file. The data file may have previously been saved in association with the input file from 1804 and/or the output file from 1806. Thus, the same data values may be reused for subsequent tests. Alternatively, the data file may be provided specifically for the current test iteration.

At 1810, the browser extension executes the test code using values contained in the data file. The data file can include values corresponding to variables defined in the test code. For example, referring to FIG. 10, the data file may specify "John" as the first name of the new contact. However, values can also be hard coded. For example, one or more of the statements in the input file may expressly indicate a value to use.

As shown in FIG. 18, when the website is subsequently updated, the website can be reloaded to repeat the process 1800. Since the browser extension can generate or update the selectors in the test code automatically, the user supplying the input file does not need to review the test code to verify that the selectors are valid. Instead, the user can simply check the input file to make sure that the statements still apply to the updated website. The user can modify the input file and/or the data file as needed, without necessarily making direct edits to the test code.

Figure 19:
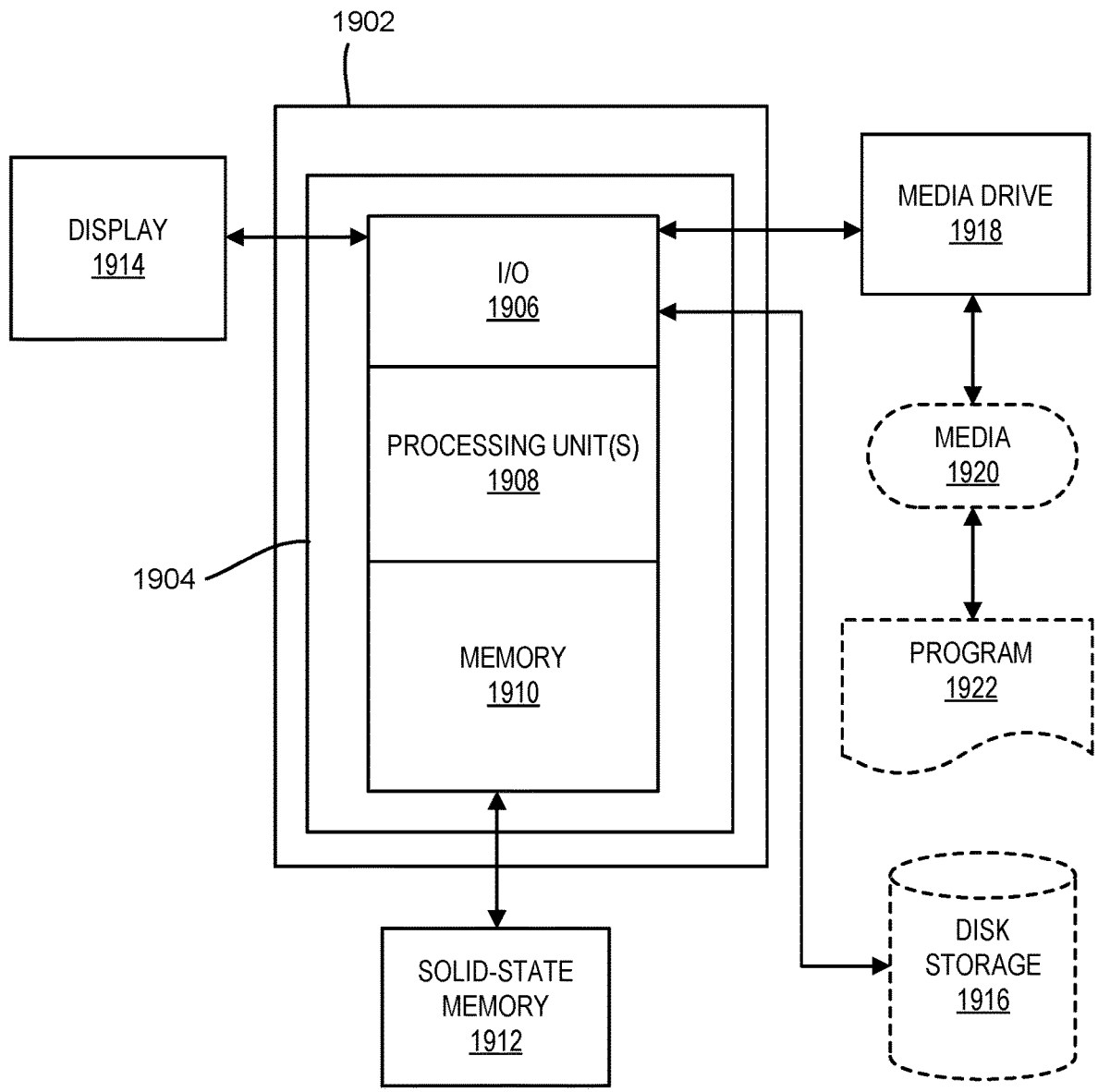
FIG. 19 shows an example computing system usable for implementing one or more embodiments.

FIG. 19 shows an example computing system 1900 usable for implementing one or more embodiments, including any of the processes disclosed herein. The main system 1902 includes a motherboard 1904 having an input/output (I/O) section 1906, one or more processing units 1908 (e.g., a CPU and/or a GPU), and a memory 1910. The memory 1910 may have a solid-state memory 1912 associated with it. The solid-state memory 1912 can include one or more removable solid-state storage devices, e.g., a flash memory card or Universal Serial Bus (USB) flash drive. Alternatively or additionally, the solid-state memory 1912 can include one or more non-removable solid-state storage devices, e.g., a solid-state drive (SSD). In some embodiments, the memory 1910 stores a webpage and/or a web-related software application. For example, the memory 1910 may correspond to the memory 121 of the user system 120-A in FIG. 1, a memory of the user system 120-B, or a memory of the web server 110.

The I/O section 1906 can be connected to a display 1914, a keyboard and/or other user input device (not shown), a disk storage unit 1916, and a media drive unit 1918. The media drive unit 1918 can read/write a computer-readable medium 1920, which can contain programs 1922 and/or data. Computing system 1900 can include a web browser. Moreover, it is noted that computing system 1900 can be configured to include additional systems in order to fulfill various functionalities. Computing system 1900 can communicate with other computing systems and devices based on various wired and/or wireless communication protocols such as Wi-Fi, Bluetooth®, USB, Ethernet, cellular, etc.

Figure 20:
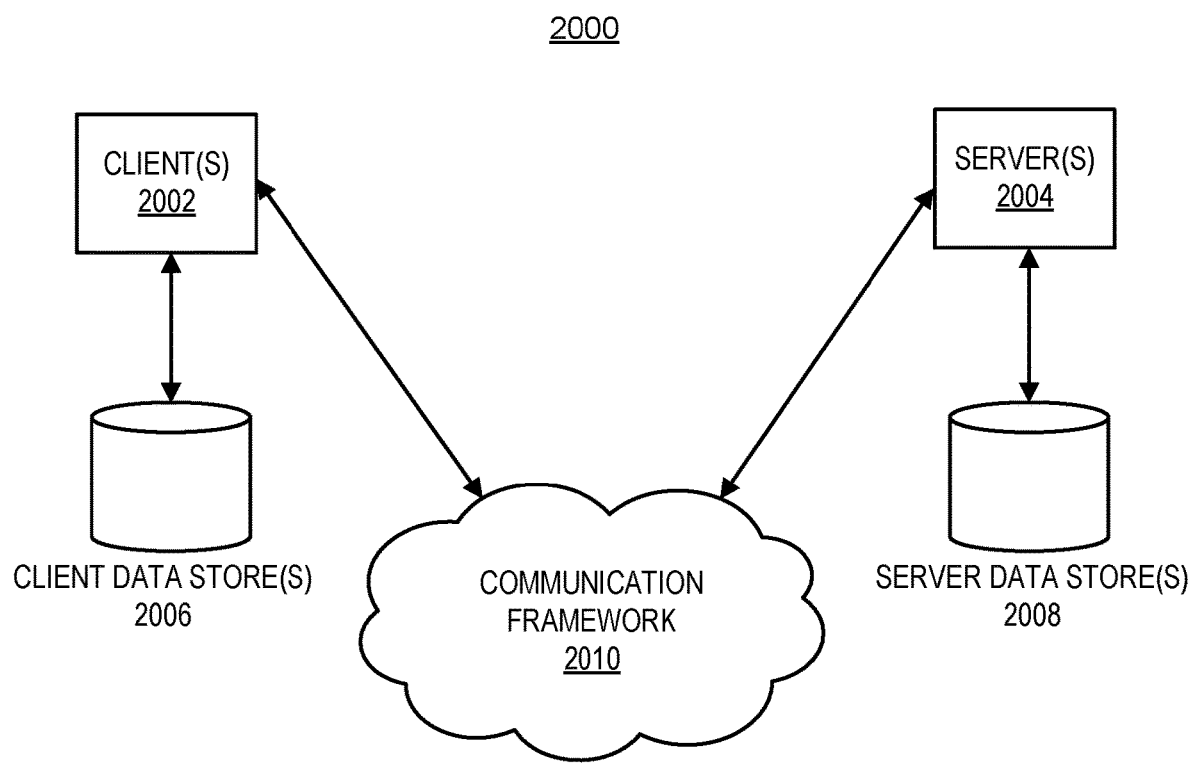
FIG. 20 is a block diagram of an example computing environment in which one or more embodiments may be implemented.

FIG. 20 is a block diagram of an example computing environment 2000 in which one or more embodiments may be implemented. Computing environment 2000 includes one or more clients 2002. The client(s) 2002 can be implemented in hardware and/or software (e.g., threads, processes, computing devices). For example, a client 2002 may correspond to a user system 120 in FIG. 1. The computing environment 2000 further includes one or more servers 2004. The server(s) 2004 can also be implemented in hardware and/or software (e.g., threads, processes, computing devices). The client(s) 2002 and the server(s) 2004 are communicatively coupled through a communication framework 2010, which can include one or more networks, e.g., the Internet. Communication between a client 2002 and a server 2004 may be in the form of a data packet adapted to be transmitted between two or more computer processes. The data packet can be formatted in accordance with a standard communication protocol such as Transmission Control Protocol/Internet Protocol (TCP/IP). The client(s) 2002 are connected to one or more client data store(s) 2006 that can be employed to store information local to the client(s) 2002. Similarly, the server(s) 2004 are connected to one or more server data store(s) 2008 that can be employed to store information local to the server(s) 2004. In some embodiments, computing environment 2000 can include a cloud-computing platform that provides one or more computing services on-demand. For example, functionality described with respect to a browser extension may be accessed through a Software as a Service (SaaS) delivery model.

These and other aspects of the disclosure may be implemented by various types of hardware, software, firmware, etc. For example, some features of the disclosure may be implemented, at least in part, by a machine-readable medium including program instructions, state information, etc., for performing various operations described herein. Examples of program instructions include both machine code, such as produced by a compiler, and files containing higher-level code that may be executed by the computer using an interpreter. Machine-readable media can include non-transitory computer-readable storage media. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory (ROM) and random access memory (RAM).

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope should not be limited by reference to such advantages. Rather, the scope should be determined with reference to the appended claims.

What is claimed is:

1. A computer-implemented method comprising:
    obtaining, by a software application executing on a computer system, one or more input statements in natural language format, the software application comprising a browser extension executed in conjunction with a web browser;
    analyzing, by the software application using natural language processing, the one or more input statements to identify a first web element on a webpage and an action to be performed with respect to the first web element;
    generating, by the software application, a selector based on one or more attributes of the first web element, the selector being operable as an address of the first web element;
    generating, by the software application, a plurality of code fragments comprising a first code fragment containing the selector, the first code fragment being executable to perform the action with respect to the first web element;
    saving the plurality of code fragments to an output file in a form readable by the browser extension; and
    providing, by the software application, user access to the selector, comprising displaying the selector on a user interface of the browser extension.

2. The computer-implemented method of claim 1, wherein the selector is a relative XPath selector, an absolute XPath selector or a Cascading Style Sheets (CSS) selector.

3. The computer-implemented method of claim 1, wherein the action to be performed with respect to the first web element corresponds to generating the selector for the first web element.

4. The computer-implemented method of claim 1, the one or more input statements including a statement referring to a second web element, the plurality of code fragments further comprising a second code fragment containing a selector for the second web element, the method further comprising:
    storing the first code fragment and the second code fragment as part of a test script.

5. The computer-implemented method of claim 4, wherein the first web element and the second web element are on different webpages.

6. The computer-implemented method of claim 4, wherein the one or more input statements define a sequence of actions capable of being performed by an end-user accessing the webpage, and wherein the test script is executable to simulate the end-user performing the sequence of actions.

7. The computer-implemented method of claim 1, wherein the first code fragment includes a variable, the method further comprising:
    obtaining, by the software application, a data file containing a value for the variable; and
    executing the first code fragment using the value in the data file.

8. The computer-implemented method of claim 1, further comprising:
    determining, by the software application after the webpage has been updated, that the selector no longer addresses the first web element;
    generating, by the software application, a new selector for the first web element based on a Document Object Model (DOM) of the updated webpage.

9. The computer-implemented method of claim 8, further comprising:
    overwriting, by the software application, the selector as saved in the output file with the new selector.

10. The computer-implemented method of claim 1, wherein the software application identifies the first web element based on an input statement indicating an order in which the first web element occurs on the webpage.

11. The computer-implemented method of claim 1, wherein the software application identifies the first web element based on an input statement indicating a location of the first web element on the webpage.

12. The computer-implemented method of claim 1, wherein the software application identifies the first web element based on an input statement indicating a location of the first web element relative to a second web element on the webpage.

13. The computer-implemented method of claim 1, further comprising:
    determining, by the software application, that a plurality of web elements on the webpage are possible matches to a web element described in the one or more input statements;
    responsive to determining that the plurality of web elements are possible matches, highlighting:
        the plurality of web elements on the webpage,
        a set of Document Object Model (DOM) nodes corresponding to the plurality of web elements, or
        both the plurality of web elements and the set of DOM nodes; and
    identifying the first web element based on user input selecting from among the plurality of web elements as highlighted or user input selecting from among the set of DOM nodes as highlighted.

14. A computer system comprising:
    one or more processors; and
    memory storing instructions implementing a software application executable on the computer system, the software application comprising a browser extension executed in conjunction with a web browser, the instructions are configured to cause the one or more processors to:

obtain one or more input statements in natural language format;

analyze, using natural language processing, the one or more input statements to identify a first web element of a webpage and an action to be performed with respect to the first web element;

generate a selector based on one or more attributes of the first web element, the selector being operable as an address of the first web element;

generate a plurality of code fragments comprising a first code fragment containing the selector, the first code fragment being executable to perform the action with respect to the first web element;

save the plurality of code fragments to an output file in a form readable by the browser extension; and provide user access to the selector, through at least displaying the selector on a user interface of the browser extension.

15. The computer system of claim 14, wherein the action to be performed with respect to the first web element corresponds to generating the selector for the first web element.

16. The computer system of claim 14, the one or more input statements including a statement referring to a second web element, the plurality of code fragments further comprising a second code fragment containing a selector for the second web element, the instructions being further configured to cause the one or more processors to:

store the first code fragment and the second code fragment as part of a test script.

17. The computer system of claim 16, wherein the first web element and the second web element are on different webpages.

18. A non-transitory computer-readable medium storing instructions implementing a software application comprising a browser extension executable in conjunction with a web browser, the instructions being executable by one or more processors of a computer system to:

obtain one or more input statements in natural language format;

analyze, using natural language processing, the one or more input statements to identify a first web element of a webpage and an action to be performed with respect to the first web element;

generate a selector based on one or more attributes of the first web element, the selector being operable as an address of the first web element;

generate a plurality of code fragments comprising a first code fragment containing the selector, the first code fragment being executable to perform the action with respect to the first web element;

save the plurality of code fragments to an output file in a form readable by the browser extension; and provide user access to the selector, through at least displaying the selector on a user interface of the browser extension.

* * * * *